(12) United States Patent
Hashimoto et al.

(10) Patent No.: US 7,467,648 B2
(45) Date of Patent: Dec. 23, 2008

(54) COIL FORMING AND INSERTING DEVICE AND COIL FORMING AND INSERTING METHOD

(75) Inventors: Shingo Hashimoto, Anjo (JP); Tooru Kuroyanagi, Anjo (JP)

(73) Assignee: Aisin AW Co., Ltd. (JP)

( * ) Notice: Subject to any disclaimer, the term of this patent is extended or adjusted under 35 U.S.C. 154(b) by 347 days.

(21) Appl. No.: 10/529,741

(22) PCT Filed: Apr. 20, 2004

(86) PCT No.: PCT/JP2004/005650

§ 371 (c)(1),
(2), (4) Date: Oct. 6, 2005

(87) PCT Pub. No.: WO2004/095678

PCT Pub. Date: Nov. 4, 2004

(65) Prior Publication Data
US 2006/0230604 A1    Oct. 19, 2006

(30) Foreign Application Priority Data
Apr. 21, 2003   (JP) .............................. 2003-116222

(51) Int. Cl.
*B21F 3/00*       (2006.01)
*B21F 45/00*      (2006.01)
*B21F 3/04*       (2006.01)
*H02K 15/085*     (2006.01)

(52) U.S. Cl. .................... 140/92.1; 140/92.2; 140/71 C; 242/432.5; 242/437

(58) Field of Classification Search ............... 140/92.1, 140/92.2, 71 C, 124; 242/432.2, 432.5, 437, 242/443
See application file for complete search history.

(56) References Cited

U.S. PATENT DOCUMENTS

| | | | |
|---|---|---|---|
| 3,686,735 A * | 8/1972 | Hill et al. ........................ 29/732 |
| 5,647,405 A * | 7/1997 | Fichtner et al. ............. 140/92.1 |
| 6,196,273 B1 * | 3/2001 | Barrera ........................ 140/92.2 |
| 6,206,052 B1 * | 3/2001 | Bo .............................. 140/92.1 |

FOREIGN PATENT DOCUMENTS

| | | |
|---|---|---|
| JP | 53-064701 | 6/1978 |
| JP | 2000-253631 | 9/2000 |

* cited by examiner

*Primary Examiner*—Derris H. Banks
*Assistant Examiner*—Teresa Bonk
(74) *Attorney, Agent, or Firm*—Bacon & Thomas, PLLC

(57) ABSTRACT

A coil forming and insertion apparatus includes plural coil winding frames, a winding jig for forming a multipole coil, plural coil receiving portions, and an inserter jig for inserting and arranging the multipole coil in slots of a stator core. The coil forming and insertion apparatus has each coil receiving portion opposed to a coil winding frame, the multipole coil is formed by connecting the monopole coils wound on the coil winding frames and the multipole coil is transferred from the winding jig to the inserter jig.

19 Claims, 18 Drawing Sheets

COIL FORMING AND INSERTING DEVICE AND COIL FORMING AND INSERTING METHOD

CROSS-REFERENCE TO RELATED APPLICATIONS

This application is a National Phase Application (35 USC 371) of PCT/JP2004/005650 and claims priority of Japanese Application No. 2003-116222, filed Apr. 21, 2003.

TECHNICAL FIELD

The present invention relates to a coil forming and insertion device and to a method for forming a coil and for inserting and arranging this coil in a stator core to be incorporated into an electric motor.

BACKGROUND ART

In the manufacture of a motor having a stator with slots for insertion of plural monopole coils into slots of the stator core, a multipole coil is formed by joining the plurality of the monopole coils.

In a conventional coil forming method, a winder guiding an electric wire (wire) travels around a fixed winding frame, and the electric wire is wound around the winding frame to form the monopole coil.

JP-A-2000-253631 discloses a winding apparatus including a winding frame with a changeable outside diameter and a flyer which is rotated around the winding frame. The coil with joined poles (multi pole coil) for use in a motor is formed by sequentially dropping the wound monopole coil onto a blade.

However, in the winding apparatus of JP-A-2000-253631 when the monopole coil is dropped onto the blade, the monopole coil is intended to drop into a clearance between needles of the blade from the winding frame positioned above the blade. However, there exists the possibility that, in certain cases, the monopole coil can not drop to the clearance. Accordingly, transfer and mounting of the monopole coil is unreliable. Further, in certain cases, when the monopole coil drops onto the blade, the order of the electric wires in this monopole coil will change from the winding order in which the wires were wound.

Further, in the method of JP-A-2000-253631, after one monopole coil is formed on one winding frame, this monopole coil is dropped in sequence onto the blade. Therefore, there is the possibility that the lengths of the connecting wires connecting the respective monopole coils together will differ. The multipole coil having the respective monopole coils joined by the connecting wires is formed on the blade. Accordingly, the state of the multipole coil products may vary.

SUMMARY OF THE INVENTION

The present invention is made in consideration of the problems associated with the above-described conventional apparatus, and provides a coil forming and insertion device and a coil forming and insertion method providing a constant length for the connecting wires connecting the respective monopole coils. Further, the apparatus of the present invention is capable of mounting the multipole coils approximately simultaneously and reliably delivering each monopole coil to coil receiving portions almost without change from the state in which multipole coil is formed.

In a first aspect the present invention provides in a coil forming apparatus comprising a winding jig for forming a multipole coil by joining plural monopole coils, each formed by winding an electric wire on a coil winding frame, and an inserter jig opposed to the winding jig and receiving the multipole coil and inserting it into slots formed on the inner circumferential face of a stator core.

The winding jig has plural coil winding frames, and the inserter jig has plural coil receiving elements (portions) for respectively receiving the monopole coils from the coil winding frames. Each coil receiving element is arranged opposed to a coil winding frame, and the multipole coil, formed by joining the monopole coils wound around each coil winding frame, is formed so as to facilitate transfer from the winding jig to the inserter jig.

In operation of the coil forming apparatus of the invention, the multipole coil is formed in the above winding jig and each monopole coil is approximately simultaneously delivered to the coil receiving elements and can be transferred to the inserter jig as the multipole coil.

Because monopole coils are formed on coil winding frames having mutually fixed positions, it is possible to make the connecting wires formed between the respective monopole coils have the same length.

When the coil winding frames holding the monopole coils and the coil receiving portions are aligned in opposition to each other, the monopole coils can be approximately simultaneously and reliably delivered to the coil receiving elements. Therefore, in this transfer, there is almost no change in the winding order of the electric wire loops in the monopole coils from the winding order in which the monopole coils are formed.

A second embodiment of the apparatus of the invention comprises a winding jig for forming a multipole coil by joining plural monopole coils, and an inserter jig opposed to the winding jig for receiving the multipole coil and for inserting and arranging the multipole coil in slots formed in the inner circumferential face of a stator core.

The winding jig has plural coil winding frames for forming the monopole coils by winding the electric wire about winding axes located the same distance from the central axis of the winding jig, and arranged approximately parallel to each other.

The inserter jig has a slidable core for pushing the multipole coil into slots of the stator core, and also has plural coil receiving elements (portions) arranged around the outer circumferential face of the slidable core for receiving a monopole coil from a coil winding frame.

When the multipole coil is moved from the winding jig to the inserter jig, each coil receiving portion is arranged opposed to the end face of a coil winding frame and aligned in the direction of the winding axis. Subsequently, each coil winding frame is connected to a coil receiving portion to form a surface defining transfer path for sliding a monopole coil in transfer of same.

In the coil forming and insertion device of the second embodiment of the invention, as in the first embodiment, the multipole coil is formed in the above winding jig and each monopole coil is approximately simultaneously and reliably delivered to the coil receiving elements and can be moved and mounted on the inserter jig.

Namely, in the winding jig of the second embodiment, the plural coil winding frames are arranged approximately in parallel with each other and the multipole coil is formed by winding a monopole coil around each coil winding frame. Therefore, a monopole coil is formed on each of the coil winding frames in the mutually fixed relative position.

Accordingly, it is possible to make the connecting wires between the respective monopole coils of the same length.

Further, the above inserter jig has each coil receiving portion aligned in opposition to the end face of a coil winding frame. When each coil winding frame and each coil receiving portion are connected, they together form a transfer surface/path. Therefore, when each monopole coil is delivered from its coil winding frame to the coil receiving elements, each monopole coil can be reliably moved along its thus formed transfer path maintained within the center of the monopole coil.

Each monopole coil can be approximately simultaneously delivered to the coil receiving elements. Therefore, in this transfer, there is almost no case in which the winding order of the electric wire loops in each monopole coil will be changed from the winding order in which the monopole coil is formed. Therefore, the multipole coil can be transferred from the winding jig to the inserter jig almost without any change in the state of the multipole coil.

A third aspect of the invention resides in a coil forming insertion method in which a winding jig for forming and joining pole coils and an inserter jig for inserting and arranging the joined pole coils in slots formed on the inner circumferential face of a stator core are used. Plural monopole coils are formed and joined to form a multipole coil, the monopole coils formed by winding an electric wire around each of plural coil winding frames arranged in the winding jig. Each monopole coil held on a coil winding frame is simultaneously delivered to each of plural coil receiving elements arranged in the inserter jig, and the multipole coil is transferred to the inserter jig.

In the coil forming and insertion method of the invention, the multipole coil is formed on the above winding jig and each monopole coil is approximately simultaneously delivered to the coil receiving elements in transfer onto the inserter jig.

Therefore, as in the previously described embodiment, the length of the connecting wires connecting the respective monopole coils to each other can be made constant (equal), and the transfer operation can be performed almost without change in the forming state of the multipole coil by approximately simultaneously and reliably transferring each monopole coil to receiving elements of the inserter jig.

A fourth aspect of the invention resides in a coil forming insertion method including a coil forming step for forming a multipole coil by joining plural monopole coils formed by winding loops of an electric wire in a winding jig, a coil transfer step for moving and mounting the multipole coil from the winding jig to the inserter jig, and a coil insertion step for inserting and arranging the multipole coil in slots formed on the inner circumferential face of a stator core utilizing the inserter jig.

In the coil forming process, plural coil winding frames for forming the monopole coil by winding the electric wire are arranged in an approximately circular array approximately in parallel with each other.

In the coil transfer process, a slidable core in the inserter jig is used for pushing the multipole coil for insertion into a slot of the stator core, and also has plural coil receiving elements which are arranged on the outer circumferential face of the core and respectively receive the monopole coils from the coil winding frames. Each coil receiving element is aligned in opposition to the end face of a coil winding frame, extending in the direction of the winding axis, and each coil winding frame is connected with a coil receiving element by using the inserter jig. The connection of a coil winding frame with a coil receiving element forms a transfer path for moving each monopole coil from a coil winding frame onto a coil receiving element while the transfer path is located within the center of a monopole coil.

Therefore, the length of the connecting wires connecting the respective monopole coils to each other can be made constant, and the above-described transferring and mounting operations can be performed almost without change in the state of the multipole coil as formed by approximately simultaneously and reliably delivering each monopole coil to coil receiving elements.

It is preferred that each coil winding frame has a slot in its end face for receiving the tip portion of a coil receiving element. The multipole coil is transferred from the winding jig to the inserter jig after the tip portion of each of the coil receiving elements is fitted into the slot of each coil winding frame.

In this case, each coil winding frame and each coil receiving portion can be easily and reliably connected to each other by the above fitting operation, and a transfer surface/path is easily formed.

Further, it is preferred that the above-mentioned slots have a depth enabling the coil receiving portions (elements) to be inserted completely through the central opening of the monopole coil wound around a coil winding frame. Thus, when the above described connection has been made, the end of each coil receiving portion is necessarily inserted and arranged within the center of each monopole coil respectively mounted on the coil winding frames. Therefore, each monopole coil can be reliably transferred from the coil winding frames to the coil receiving portions.

It is also preferred that the winding jig has a core slidably mounted in the center of each coil winding frame so as to be advanced and retracted for pushing the multiple coil from the coil winding frame onto the inserter jig. In this manner the core can move the multiple coil to a predetermined position on the inserter jig.

The above-mentioned predetermined position is a position set for inserting and arranging the multipole coil, transferred from the inserter jig, into the slots of the above stator core. Thus, after the multipole coil has been moved to and mounted on the inserter jig, the multipole coil in this mounted state can be inserted and arranged in the slots of the stator core.

It is also preferred that each coil winding frame have an inner winding frame portion and an outer winding frame portion arranged opposite the inner winding frame portion. The outer winding frame portion can be moved so as to change its distance from the inner winding frame portion, i.e. moved between a winding position for winding the electric wire and a release position for separating the monopole coil from the coil winding frame after the winding operation has been completed.

When the electric wire is wound, the outside winding frame portion of each coil winding frame is set in its winding position (FIG. 3), and it is possible to form the monopole coil with a diameter determined by the distance between the outside winding frame portion and the inside winding frame portion.

Further, when the coil winding frames are connected to the coil receiving elements, each outside winding frame portion is located in its release position (FIG. 4) by reducing the distance between each outside winding frame portion and the attached inside winding frame portion, to separate the monopole coils therefrom.

It is also preferred that the outside winding frame portion is stepwise increased in diameter in a direction perpendicular to and away from the turning arm.

When the outside winding frame portion is set in its above winding position, the result is a monopole coil having a winding diameter which increases stepwise in the direction extending away from the winding jig. Therefore, when the multipole coil including this monopole coil is inserted and arranged in the slots of a stator core or a rotor core, this multipole coil can be collectively inserted and arranged by locating its large diameter side at the opening sides of the slots.

Further, when the outside winding frame portion is located in its release position, each monopole coil can be easily separated because the outside diameter of the coil winding frame is reduced in the direction away from the winding jig.

It is also preferred that the winding jig has a turning arm mounted so as to be turned about a central turning axis connected to a turning device, and also has an index holder mounted for rotation relative to the turning arm around a central axis of rotation offset from and approximately parallel to the central turning axis.

The plural coil winding frames are arranged in a circular array around the index holder, approximately equidistant from the central axis of rotation, and the winding axes of the respective coil winding frames are approximately parallel to each other and to the central turning axis. Each coil winding frame is mounted for reciprocating movement so as to be advanced and retracted along the central turning axis. In other words, each coil winding frame is mounted so as to be advanced in an "advancing direction" away from the inserter jig and away from the remaining coil winding frames, to a position where it is axially projected from and separated from the remaining coil winding frames.

To form the multipole coil, the index holder and the coil winding frames are rotated together as a unit by the turning arm with only the coil winding frame for winding the electric wire projected axially beyond the other coil winding frames and the electric wire is wound around the one projected coil winding frame. Therefore, unlike the prior art, there is no use of a winder rotating around the outer circumference of a fixed winding frame. Accordingly, each monopole coil can be formed almost without imparting torsion to the electric wire.

Further, each coil winding frame can be sequentially brought into approximate alignment with the central turning axis by rotation of the index holder. Therefore, although the coil forming apparatus has plural coil winding frames, the electric wire can be wound around the coil winding frame axis with very little eccentricity relative to the central turning axis.

After the monopole coil is formed on one coil winding frame, the index holder is rotated to bring the next adjacent coil winding frame into approximate alignment with the central turning axis.

Therefore, the electric wire can be stably wound without changing the direction from which the electric wire is supplied to each coil winding frame and the monopole coil can be stably formed, almost without torsion, on any coil winding frame.

Further, the electric wire can be easily supplied to the projected coil winding frame from a direction perpendicular to its winding axis. Therefore, the electric wire is easily supplied and is also easily wound around the coil winding frame. Further, it is possible to further reduce imparting of torsion in the coil winding operation.

In the coil transfer and mounting steps, each monopole coil is separated from a coil winding frame by reducing the outside diameter of each coil winding frame in the direction away from the turning arm. Thus, it is possible to easily form the multipole coil constructed of the monopole coils having a winding diameter which increases from one side to the other. Further, this pole joining coil can be easily separated from the winding frame.

DESCRIPTION OF THE PREFERRED EMBODIMENTS

First Embodiment

A first embodiment of coil forming apparatus and method, with formation of a multipole coil, will now be described with reference to FIGS. 1 to 11.

Figure 1:
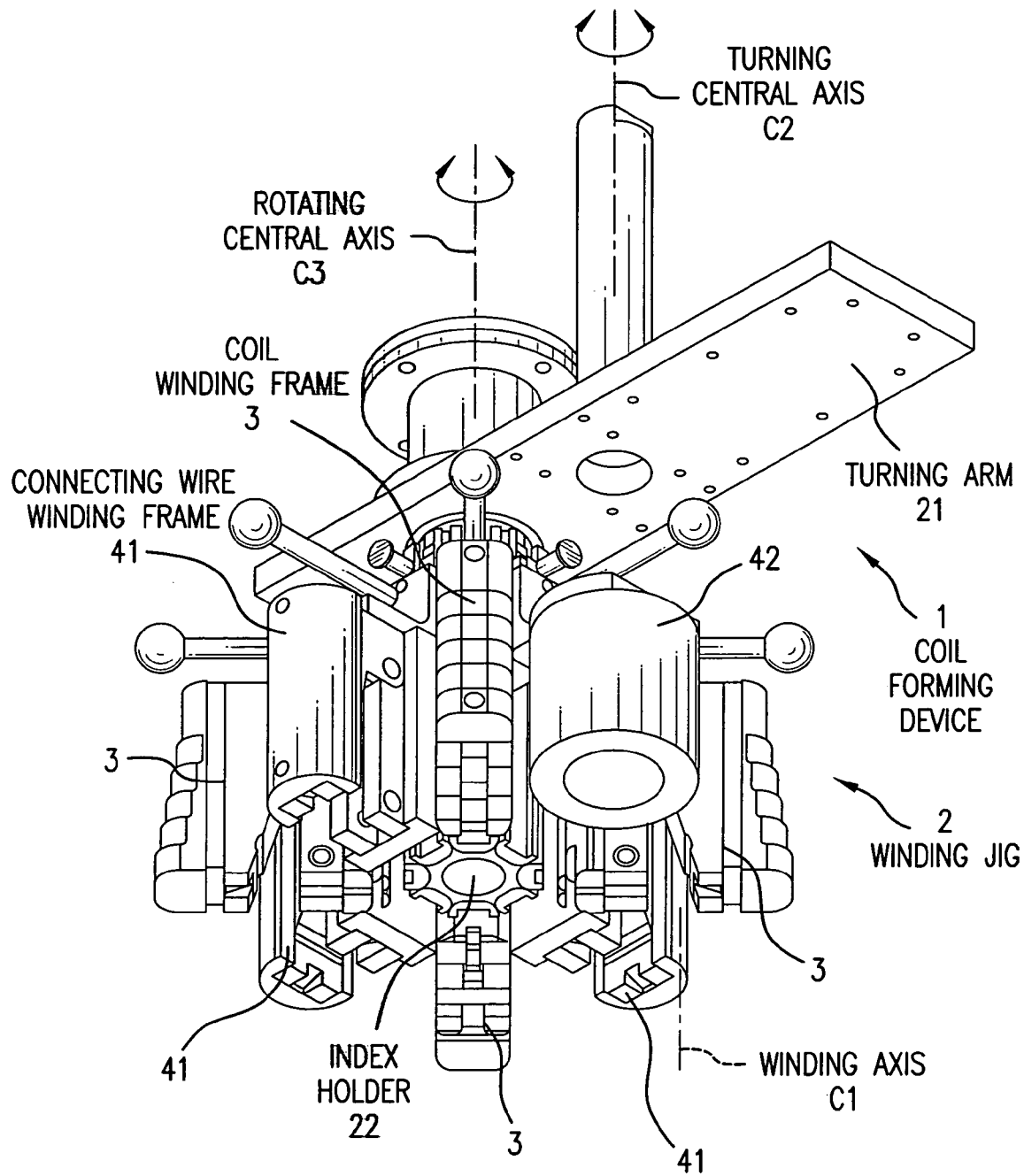
FIG. 1 is a perspective view of a first embodiment of a coil forming device in accordance with the present invention.
Figure 2:
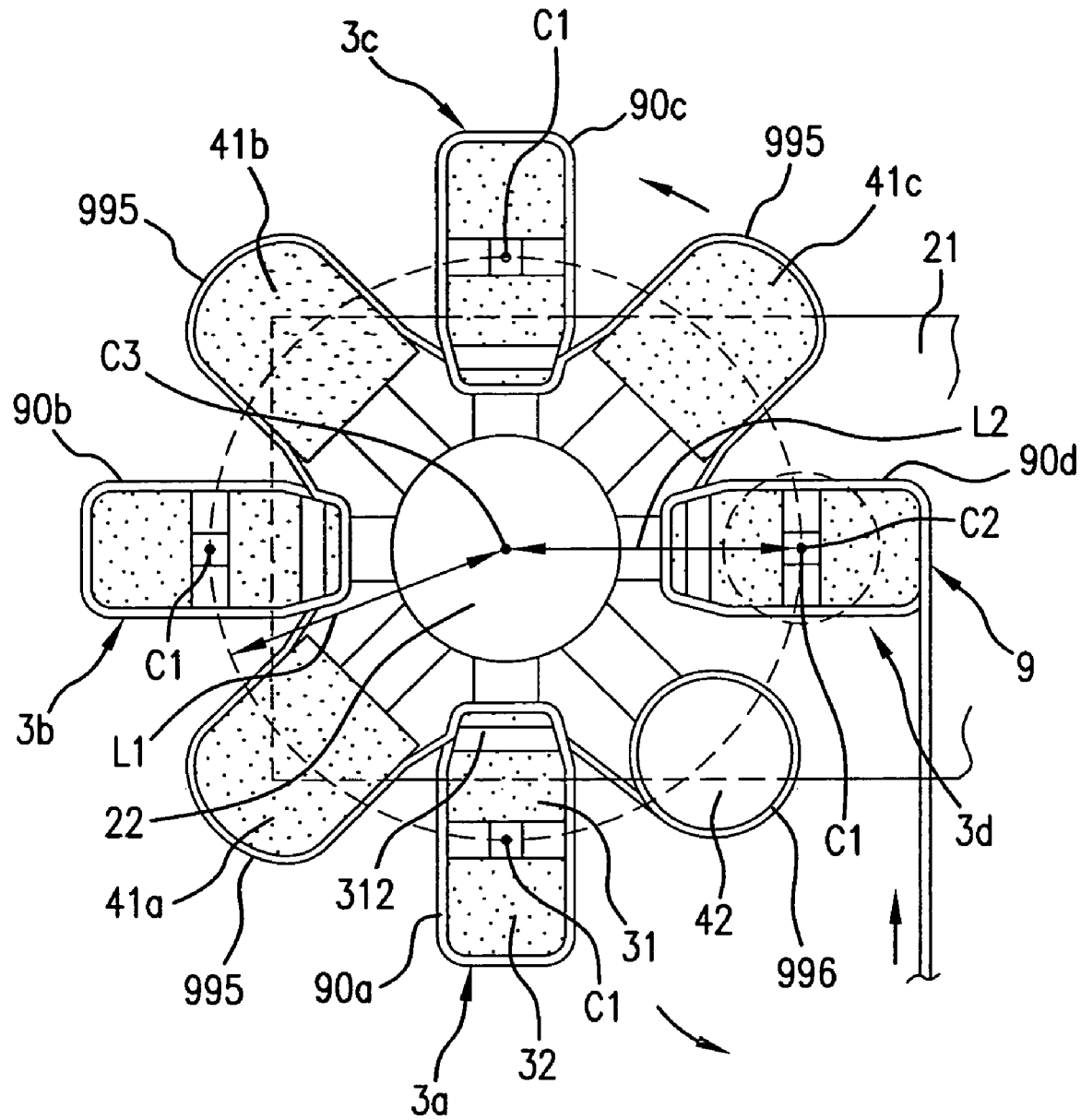
FIG. 2 is a schematic view showing the coil forming device in a state with a multipole coil formed thereon, i.e. with a monopole coil wound on each coil winding frame of the apparatus of the first embodiment.

As shown in FIGS. 1 and 2, the coil forming device 1 of the first embodiment forms a multipole coil 9 joining plural monopole coils 90. The coil forming device 1 is shown as including an unillustrated base frame, a turning arm 21 supported in the base frame for rotation around a central axis C2, and a winding jig 2. The winding jig 2 has an index holder 22 mounted for movement relative to the turning arm 21, and plural coil winding frames 3 arranged around the outer circumference of index holder 22.

The winding axes C1 for winding the electric wire 99 around the coil winding frames 3 are approximately parallel and also approximately parallel to the central turning axis C2. The coil forming device 1 is constructed such that the coil winding frames 3 for winding the above electric wire 99 can sequentially approach the central turning axis C2 by movement of the index holder 22.

As shown in FIGS. 1 and 2, the index holder 22 is mounted on the above turning arm 21 for rotation about a central rotation axis C3 located approximately in parallel with the central turning axis C2. Further, the coil winding frames 3 are arranged on the index holder 22 in an arc shape and spaced about the same distance from the central rotation axis C3.

The distance L1 from the central rotation axis C3 to the winding axes C1 of the coil winding frames 3 is set approximately equal to the offset distance L2 from the central turning axis C2 of the turning arm 21 to the central rotation axis C3 of the index holder 22.

The winding axes C1 of the coil winding frames 3 can be sequentially moved into approximate alignment with the turning central axis C2 by rotating the above index holder 22 through a predetermined angle with respect to the turning arm 21 and the electric wire 99 can be wound on the thus aligned winding frame.

Figure 11:
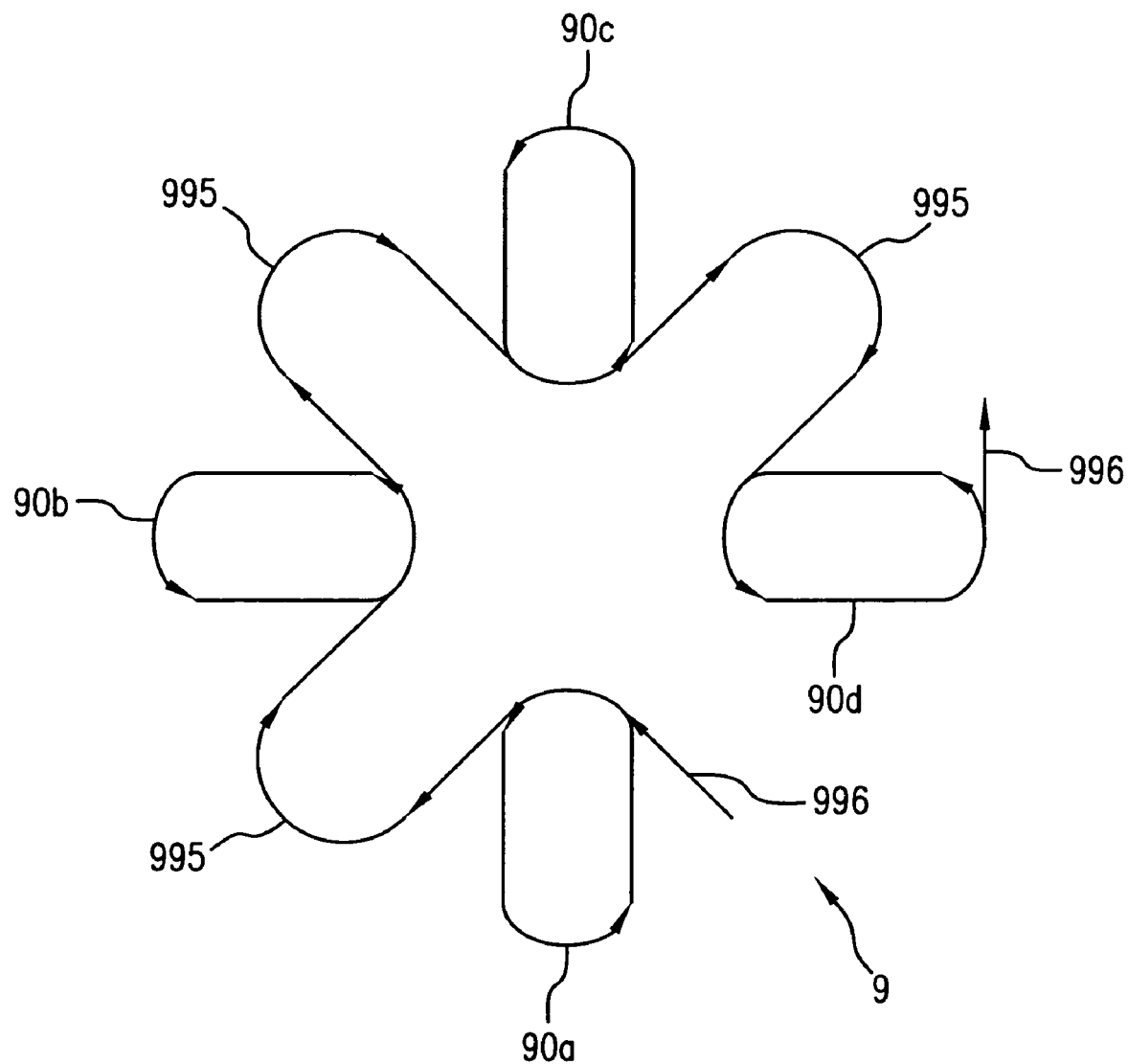
FIG. 11 is an explanatory view showing the multipole coil formed by winding the electric wire around all the winding frames in the first embodiment.

Further, a pole joining coil 9 in an arc shape can be formed by the coil winding frames 3 (see FIG. 11).

Figure 3:
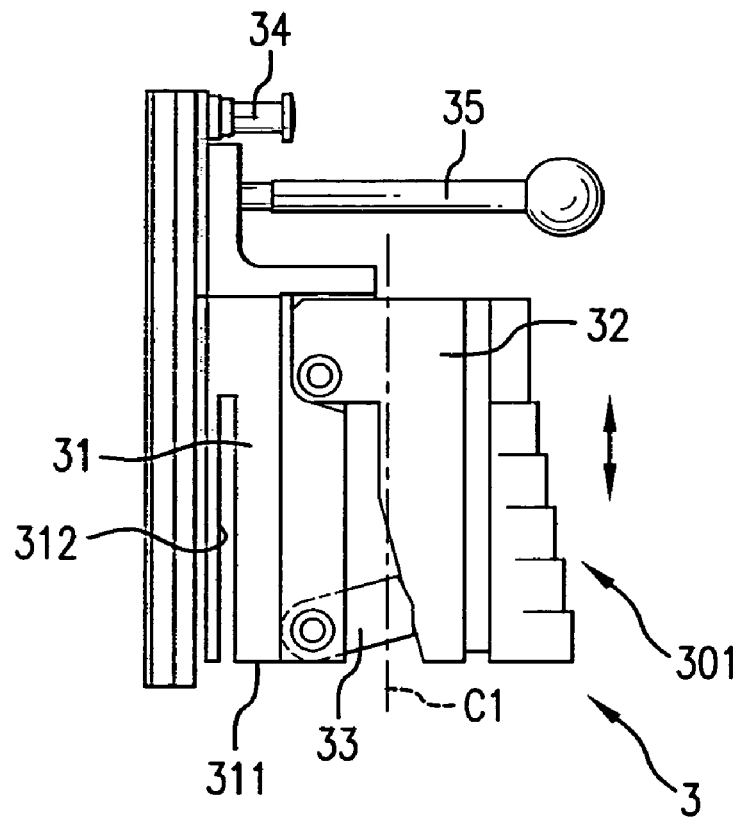
FIG. 3 is a side view of a winding frame with its outside winding frame portion located in a winding position, in accordance with the first embodiment.

As shown in FIG. 3, each coil winding frame 3 is arranged so as to be advanced and retracted along central turning axis C2. The coil winding frame 3 for winding the above electric wire 99 can be projected relative to the remaining coil winding frames 3 by advancing the coil winding frame 3 in a direction away from the turning arm 21. Therefore, the electric wire 99 can be easily supplied to the above projected coil winding frame 3 in a direction perpendicular to its winding axis C1. Accordingly, the electric wire 99 is easily supplied and can be easily wound around the coil winding frame 3.

As shown in FIG. 2, each coil winding frame 3 is arranged on the outer circumference of the index holder 22. In this example, the coil winding frames 3 are arranged at approximately equal intervals on the outer circumferential face of the index holder 22. Further, in this example, four coil winding frames 3 are arranged to form the multipole coil 9 by joining four monopole coils 90.

Figure 4:
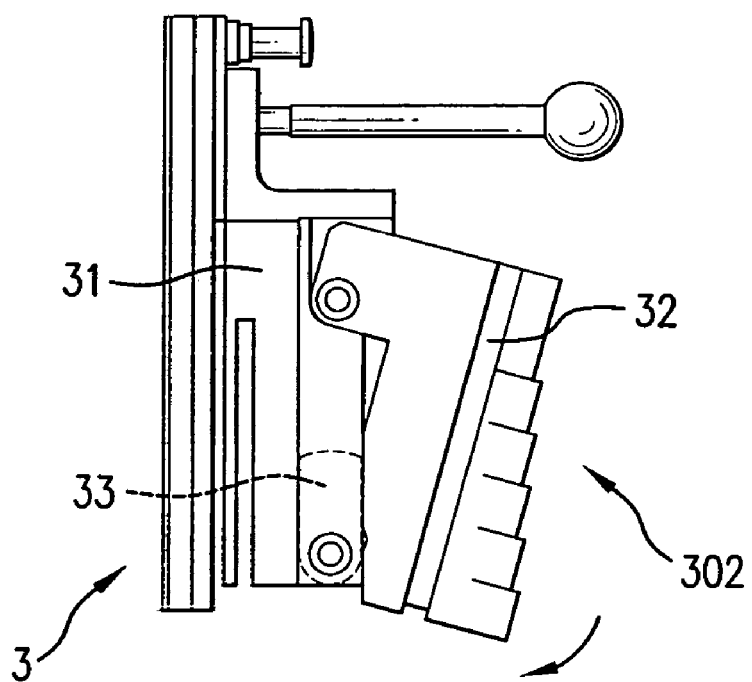
FIG. 4 is a side view of the winding frame of FIG. 3 with its outside winding frame portion located in a release position.

As shown in FIGS. 3 and 4, each coil winding frame 3 has an inside winding frame portion 31 attached to the index holder 22, and an outside winding frame portion 32 pivotally attached to the inside winding frame portion 31. The outside winding frame portion 32 can be moved so as to change the distance between the outside winding frame portion 32 and the inside winding frame portion 31, between a winding position 301 for winding the electric wire 99 as shown in FIG. 3 and a coil release position 302 for separating the monopole coil 90 from the coil winding frame 3 after completion of the winding operation as shown in FIG. 4. Further, the diameter of the outside winding frame portion 32 increases stepwise in a direction perpendicular to and away from the turning arm 21.

As shown in FIG. 3, when the outside winding frame portion 32 is set in the winding position 301, the outside diameter of the coil winding frame 3 increases stepwise away from the turning arm 31. Accordingly, it is possible to form the monopole coil 90 with its diameter increasing away from the turning arm 21. It is also possible to form the monopole coil 90 having the winding diameter of a regular size determined by the distance between the outside winding frame portion 32 and the inside winding frame portion 31.

When the multipole coil 9 is inserted and arranged in the slots 810 in the stator core 81, the larger winding diameter is located at the opening sides of the slots 810. Coil end portions of each monopole coil 90, which project from both axial ends of the stator core 81, are reduced in size by bending them so as to extend outward relative to the stator core 81. Namely, the length of each monopole coil 90 approaches a required minimum and the coil end portion can be reduced in size by forming each monopole coil 90 with its winding diameter increasing from one side to the other side.

As shown in FIG. 4, when the outside winding frame portion 32 is set in the release position 302, the outside diameter of the coil winding frame 3 is reduced in the downward direction. Each monopole coil 90 can be easily removed by reducing the distance between the outside winding frame portion 32 and the inside winding frame portion 31.

As shown in FIGS. 3 and 4, each coil winding frame 3 has a handle 35 for manually advancing and retracting and is fixed in the advanced position or the retracted position by a positioning pin 34. Alternatively, each coil winding frame 3 can be advanced and retracted by using a cylinder or a motor.

A cam 33 is pivotally mounted in each inside winding frame portion 31 of each coil winding frame 3. As shown in FIG. 3, the winding position 301 is established when the cam 33 is raised toward the outside winding frame portion 32. As shown in FIG. 4, the release position 302 is assumed when the cam 33 is lowered (falls) toward the inside winding frame portion 31. The handle 35 and cam 33 thus constitute a "moving means". Alternatively, the outside winding frame portion 32 can be moved between the winding position 301 and the release position 302 by using a cylinder or a motor as the "moving means".

As shown in FIGS. 1 and 2, connecting wire winding frames 41 for winding a connecting wire 995 connecting the respective monopole coils 90 to each other are provided between (alternate with) the respective coil winding frames 3 around the index holder 22. In the embodiment depicted in FIGS. 1 and 2, three connecting wire winding frames 41 are arranged between the four coil winding frames 3. A connecting wire 995 of a prescribed length is formed between the monopole coils 90, formed on the respective coil winding frames 3, by winding the electric wire 99 around the connecting wire winding frame 41 (see FIG. 11).

As shown in FIGS. 1 and 2, in this embodiment, a lead winding frame 42 is arranged between a first coil winding frame 3a for forming the first coil and a fourth coil winding frame 3d for forming the final coil. The lead winding frame 42 is arranged to secure a predetermined length of the lead wire 996 by winding the electric wire 99 in advance before the electric wire 99 is wound around the first coil winding frame 3a. This lead wire 996 is connected to the first monopole coil 90a formed on the first coil winding frame 3a (see FIG. 11).

In this embodiment, the sectional shape of the lead winding frame 42 is approximately circular, and the lead wire 996 of a predetermined length can be secured to the end of the first monopole coil 90a without bending of the electric wire 99.

Similar to the coil winding frame 3, the connecting wire winding frame 41 and the lead winding frame 42 can also be advanced and retracted in a direction along the central turning axis C2 of the index holder 22, and are advanced in a direction away from the turning arm 21 so as project axially beyond the remaining coil winding frames 3 and connecting wire winding frames 41.

As shown in FIGS. 1 and 2, the above turning arm 21 can be turned in both clockwise (normal) and counter-clockwise (reverse) directions about central axis C2. In this embodiment, the joining pole coil 9 joins four monopole coils 90 wound in the same winding direction. Therefore, the direction of rotation of the turning arm 21 in winding on the coil winding frame 3 is the reverse of the direction of rotation of the turning arm 21 in winding around the connecting wire winding frame 41. Therefore, the coil forming device 1 is alternately rotated in the normal and reverse directions to form the multipole coil 9.

In the following description, the rotational direction of the turning arm 21 in winding the wire 99 around the coil winding frame 3 is referred to as the normal direction, whereas the rotational direction of the turning arm 21 in winding around the connecting wire winding frame 41 and the lead winding frame 42 is referred to as the reverse direction.

A turning device (not shown) for turning the turning arm 21 about its central turning axis C2 is provided on the base frame. In this embodiment, the turning device is manually turned by provision of a handle on the turning arm 21. Alternatively, a motor or an indexing cylinder, operated by electricity, oil or air pressure, etc. can be used for turning the turning arm 21.

A method for forming the multipole coil 9 by using the above coil forming device 1 will next be explained.

In this coil forming process, the monopole coil 90 is formed by sequentially performing the steps of indexing, projecting and winding, as described below, for each coil winding frame 3, and forming the multipole coil 9 in which the monopole coils 90 are joined.

As shown in FIG. 1, in starting operation of the coil forming device 1, the above lead winding frame 42 is located in the position closest to the central turning axis C2 of the turning arm 21, i.e. with the index holder 22 in its initial position. In this initial position, the winding axis C1 in the lead winding frame 42 is approximately aligned with the central turning axis C2 of the turning arm 21.

Figure 5:
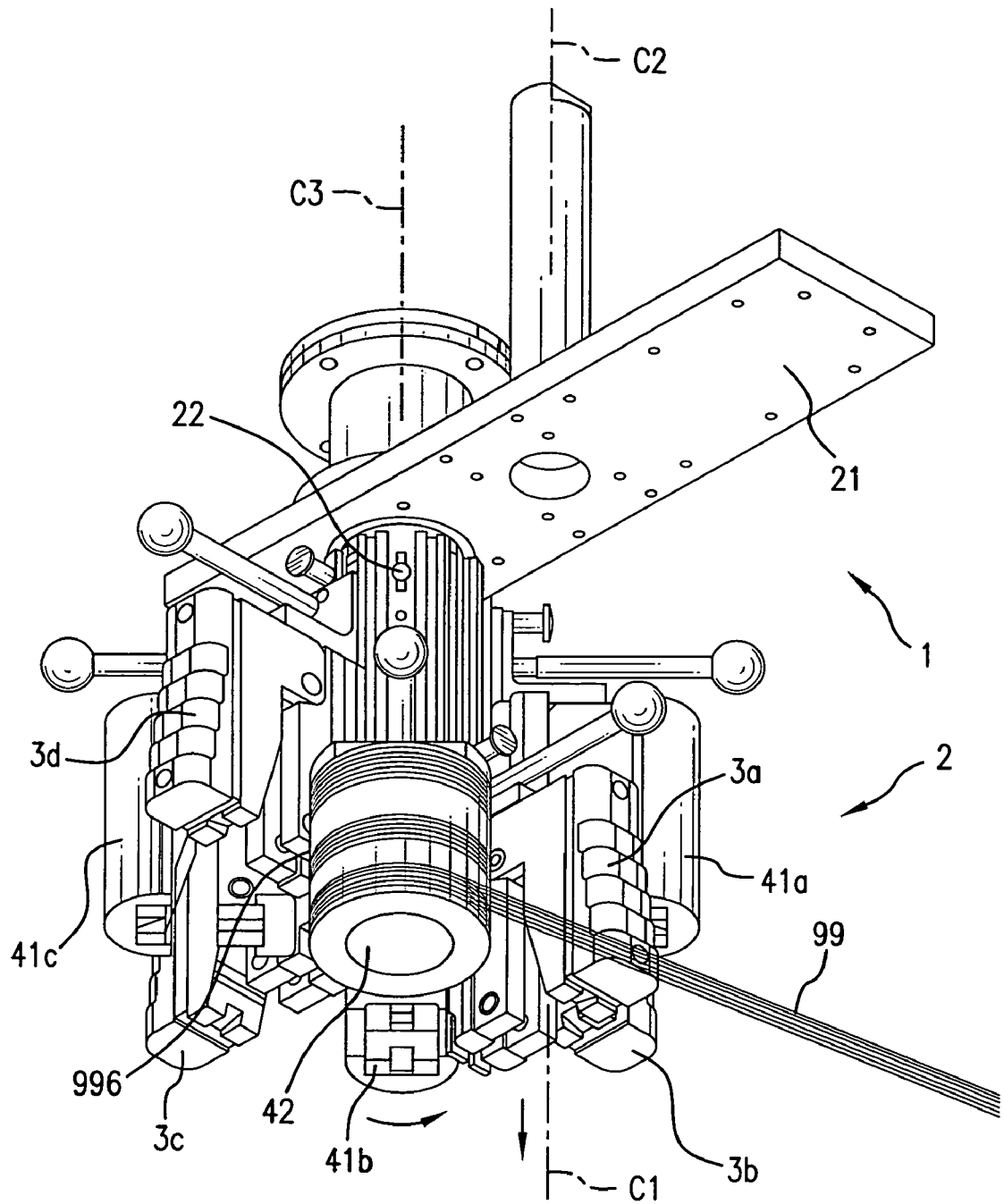
FIG. 5 is a perspective view of the coil forming device with the winding axis C1 of a first coil winding frame approximately aligned with the central turning axis of its turning arm and with the first coil winding frame projected beyond the remaining winding frames in the first embodiment.

To start the winding process, the lead winding frame 42 is advanced downward so that it is projected relative to the coil winding frames 3 and the connecting wire winding frames 41 (see FIG. 5). Then, the electric wire 99 is fed to the lead winding frame 42 and the turning arm 21 is turned in the "reverse" direction so that the electric wire 99 is wound around the lead winding frame 42 and the lead wire 996 of a predetermined length is formed.

The electric wire 99 is supplied (fed) to the coil forming device 1 in a direction perpendicular to a winding axis of a coil winding frame 3, a connecting wire winding frame 41, or the lead winding frame 42.

Next, as shown in FIG. 5, in an indexing step, the index holder 22 is rotated through a predetermined angle and the winding axis C1 of the first coil winding frame 3a is brought into approximate alignment with the central turning axis C2, i.e., the first coil winding frame 3a is advanced to the projected position (moved axially downward) and the lead winding frame 42 is retracted.

Figure 6:
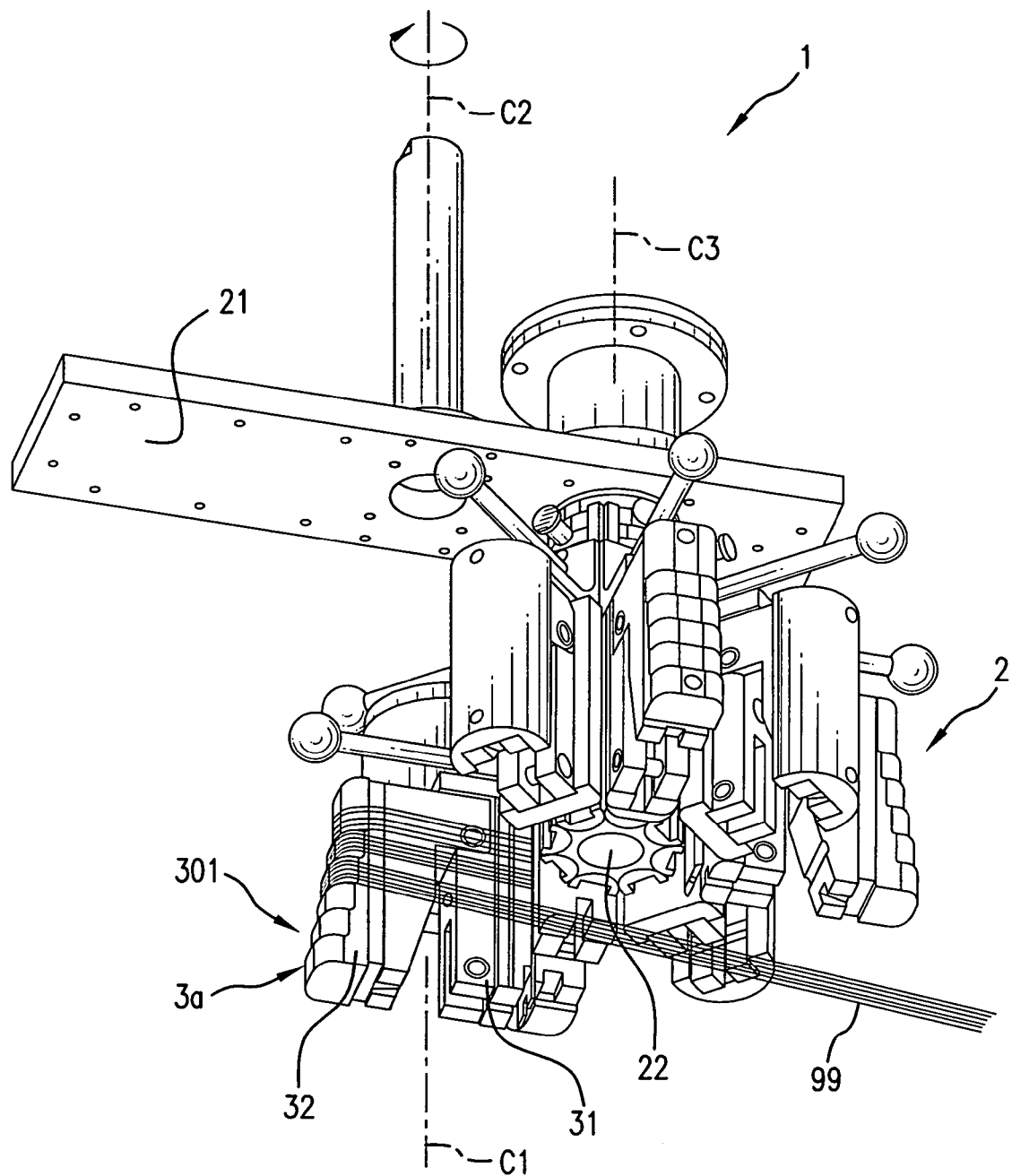
FIG. 6 is a perspective view of the coil forming apparatus of the first embodiment showing a monopole in the process of formation by winding an electric wire around the first coil winding frame.

As shown in FIG. 6, as in the above-described winding process, the electric wire 99 is supplied to the first coil winding frame 3a and the turning arm 21 is turned in the normal direction of rotation, and the first monopole coil 90a is formed by winding the electric wire 99 in plural turns around the first coil winding frame 3a. The outside winding frame portion 32 of the first coil winding frame 3a is located in the winding position 301, with the outside diameter of this first coil winding frame 3a increasing stepwise in the downward direction. In this manner the monopole coil 90 has its diameter increased in the downward direction.

Figure 7:
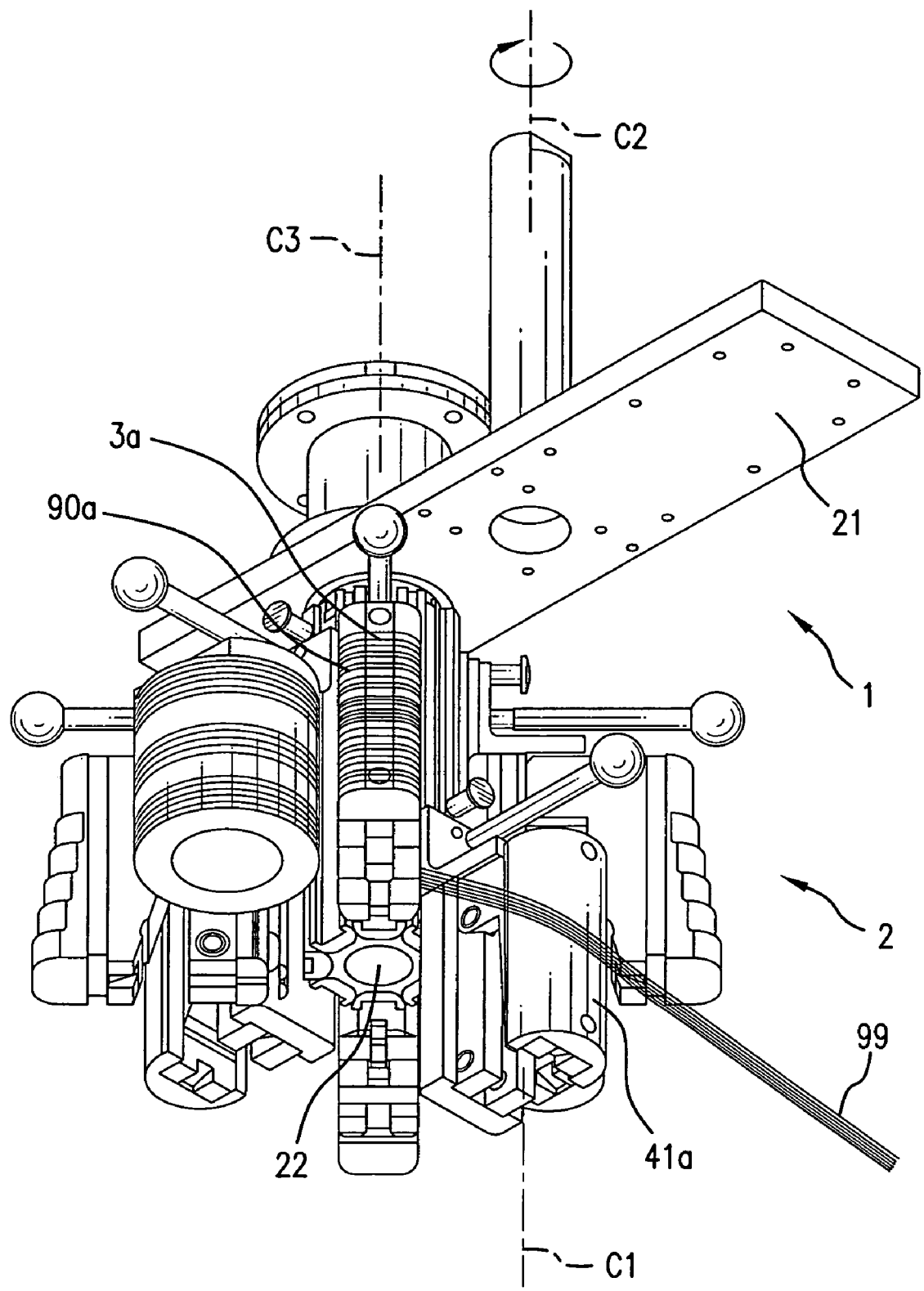
FIG. 7 is a perspective view showing the coil forming apparatus of the first embodiment with the winding axis of a first connecting wire winding frame in approximate alignment with the central turning axis of the turning arm and projected below the remaining winding frames and showing the electric wire being wound around this first connecting wire winding frame.

Next, as shown in FIG. 7, the indexing step is repeated and the winding axis C1 of a first connecting wire winding frame 41a is brought into approximate alignment with the turning central axis C2 by rotating the index holder 22 through a predetermined angle. Further, the first connecting wire winding frame 41a is lowered (projected) and the first coil winding frame 3a is retracted.

Next to form the connecting wire, the electric wire 99 is supplied to the first connecting wire winding frame 41 a and the turning arm 21 is turned in the reverse direction of rotation, and the connecting wire 995 is formed by winding the electric wire 99 around the first connecting wire winding frame 41a.

Figure 8:
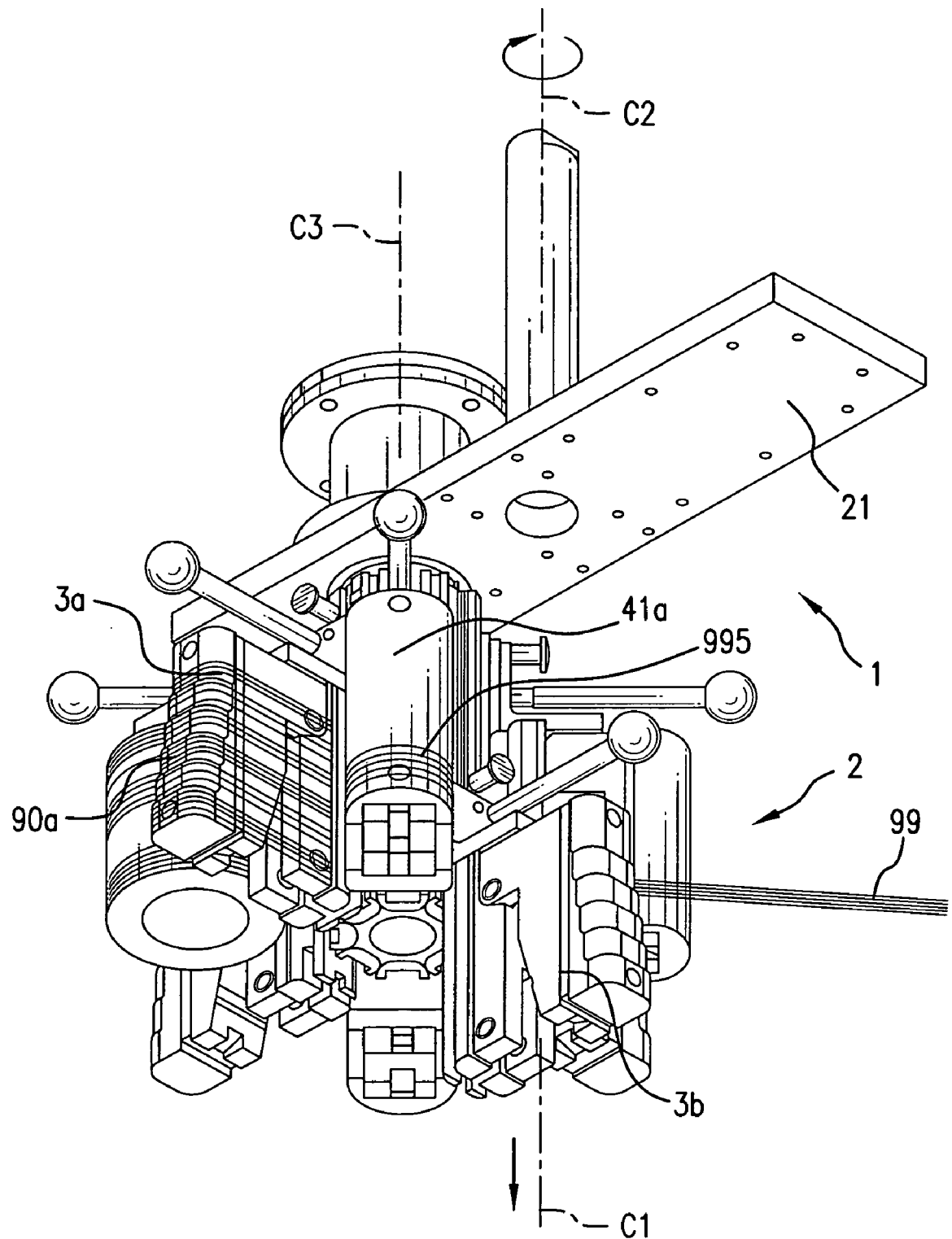
FIG. 8 is a perspective view showing the coil forming apparatus of the first embodiment with the winding axis of a second coil winding frame in approximate alignment with the central turning axis of the turning arm and projected below the remaining winding frames.

Next, as shown in FIG. 8, the indexing step is repeated and the index holder 22 is rotated through a predetermined angle to bring the winding axis C1 of a second coil winding frame 3b into approximate alignment with the central turning axis C2. The projecting step then lowers the second coil winding frame 3b to a projected position and the first connecting wire winding frame 41a is retracted.

Figure 9:
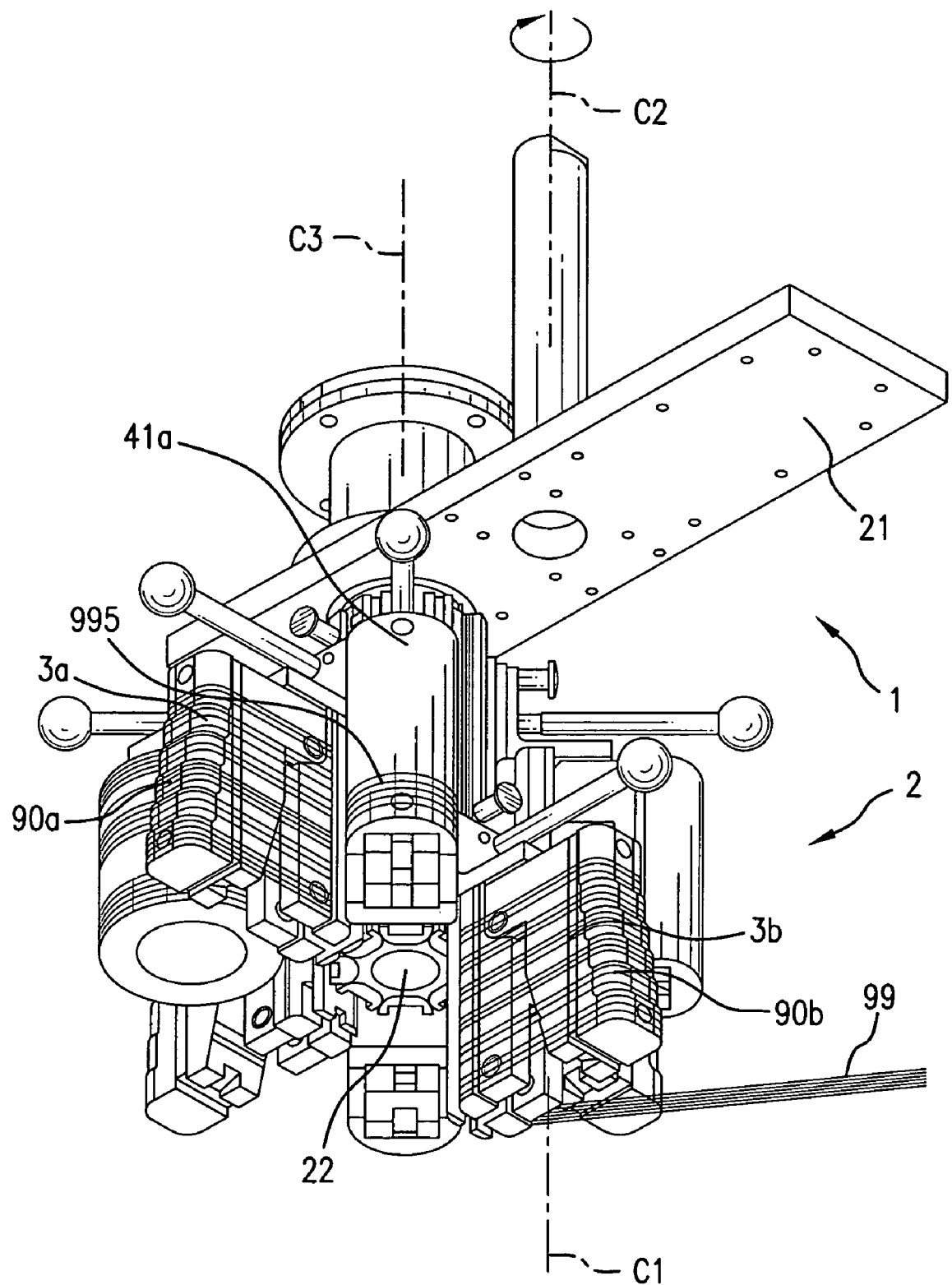
FIG. 9 is a perspective view showing the coil forming apparatus of the first embodiment with a monopole coil formed around the second coil winding frame.

As shown in FIG. 9, the above-described winding process is then repeated and the electric wire 99 is supplied to the second coil winding frame 3b and the turning arm 21 is turned in the normal direction to form the second monopole coil 90b by winding the electric wire 99 around the second coil winding frame 3b.

Figure 10:
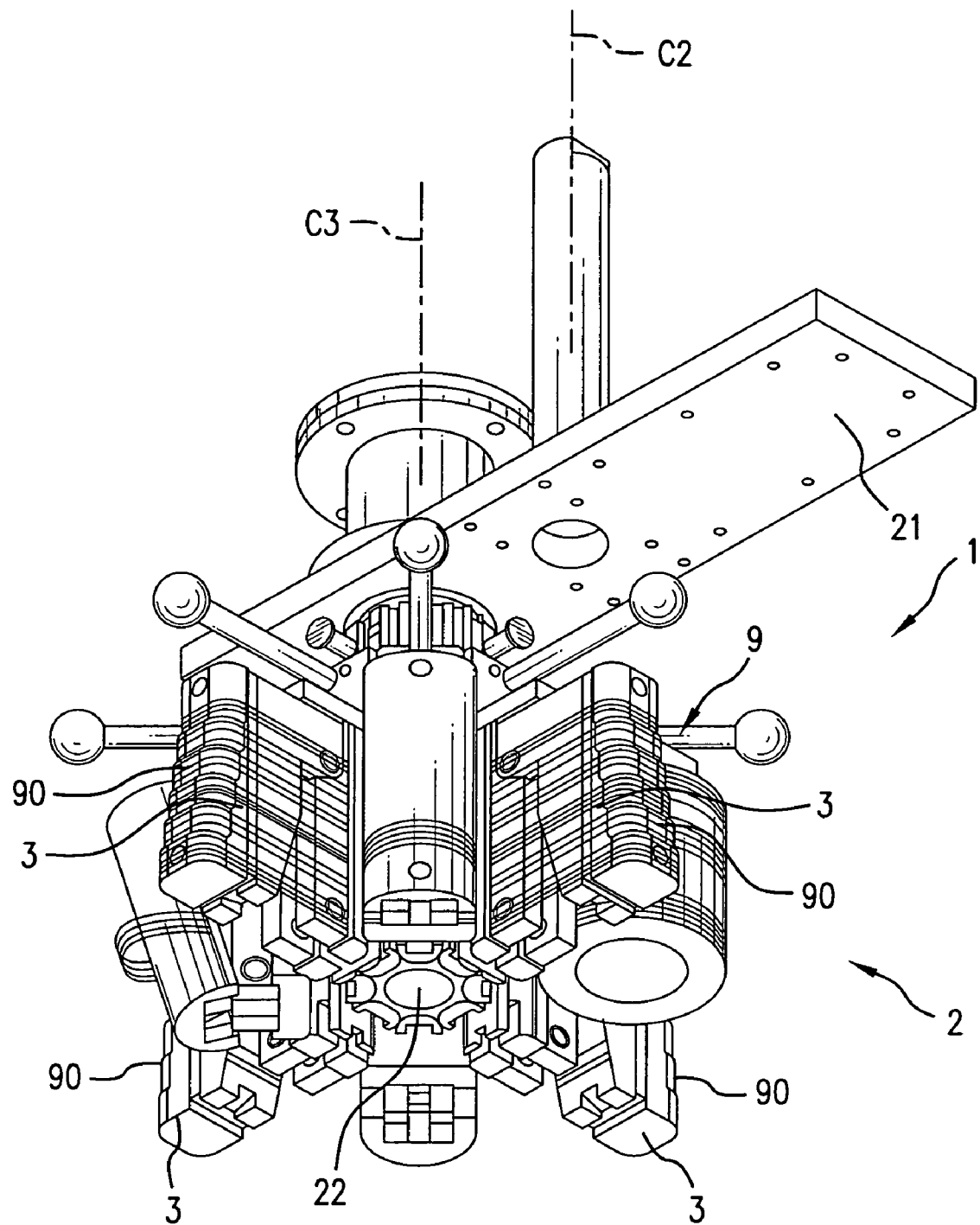
FIG. 10 is a perspective view showing the coil forming apparatus of the first embodiment with a multipole coil formed thereon by winding the electric wire around all the winding frames.

Thereafter, as shown in FIG. 10, each connecting wire 995 is formed by repeating the above-described indexing, projecting and connecting wire forming steps for a second connecting wire winding frame 41b and a third connecting wire winding frame 41c. A third monopole coil 90c and a fourth monopole coil 90d are formed by repeating the above-described indexing, projecting and winding steps on a third coil winding frame 3c and a fourth coil winding frame 3d.

As shown in FIG. 11, the multipole coil 9 is constructed by joining the first to fourth monopole coils 90a to 90d by the respective connecting wires 995. FIG. 11 schematically shows monopole coils 90a to 90d respectively formed on first to fourth coil winding frames 3a to 3d and the multipole coil 9 formed at all of the winding frames 3a to 3d, 41a to 41d, 42.

In operation of the above coil forming device 1, the above electric wire 99 is wound around the coil winding frame 3 closest to the central turning axis C2 to form monopole coil 90 by rotating the turning arm 21 together with all the winding frames 3 and the index holder 22. Therefore, no electric wire 99 is wound by rotating a winder around the outer circumference of a fixed winding frame as in the conventional case. Accordingly, each monopole coil 90 can be formed on a coil winding frame 3 almost completely without distortion of the electric wire 99.

Further, because the winding axes C1 of the coil winding frames 3 can be sequentially brought into approximate alignment with the central turning axis C2 of the above turning arm 21 by rotating the index holder 22, although the coil forming device 1 has plural coil winding frames 3, the electric wire 99 can be wound on a coil winding frame 3 which is not eccentric, or only slightly eccentric, relative to the central turning axis C2.

After a monopole coil 90 is formed in one of the coil winding frames 3, the index holder 22 is rotated and the winding axis C1 of the next adjacent coil winding frame 3 is brought into approximate alignment with the central turning axis C2, to form additional monopole coils 90 as described above. Therefore, the electric wire 99 can be constantly fed (supplied) in a direction approximately perpendicular to the winding axis C1 of the coil winding frame 3 currently in use in the winding operation. Thus, the electric wire 99 can be stably wound around each coil winding frame 3 and the multipole coil 9 stably formed almost completely without generation of torsion.

Second Embodiment

A coil forming insertion device and a coil forming insertion method in accordance with the second embodiment, utilizing a winding jig and a inserter jig will now be explained with reference to FIGS. 12 to 20. Further, a method for transferring the multipole coil held on the winding jig to the inserter jig, and a method for transferring the multipole coil from the inserter jig into slots of the stator core will also be explained.

Further, the winding jig used in the second embodiment is the same as the winding jig used in the first embodiment, and may also be explained by reference to FIGS. 1 to 11.

Figure 13:
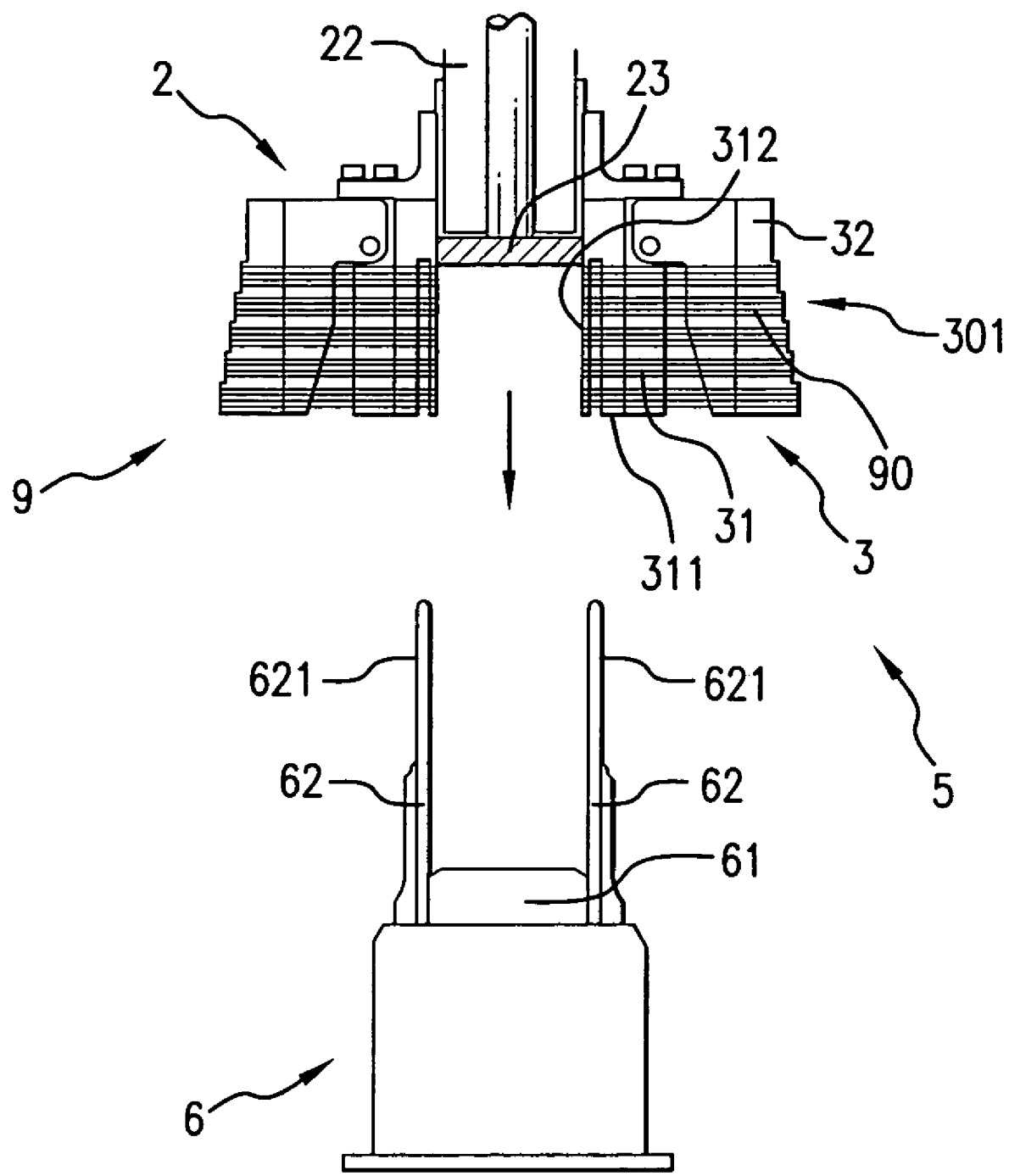
FIG. 13 is an explanatory side view showing the coil forming apparatus of the second embodiment in a state in which the winding jig holding the multipole coil is advancing toward the inserter jig.

As shown in FIG. 13, the coil forming and insertion device 5 of this second embodiment includes a winding jig 2 and an inserter jig 6. The winding jig 2 forms the multipole coil 9 by joining plural monopole coils 90 formed by winding the electric wire 99 in a loop shape. The inserter jig 6 is axially aligned in opposition to this winding jig 2 and receives the multipole coil 9 and inserts and arranges this multipole coil 9 in plural slots 810 formed on the inner circumferential face of the stator core 81.

Figure 12:
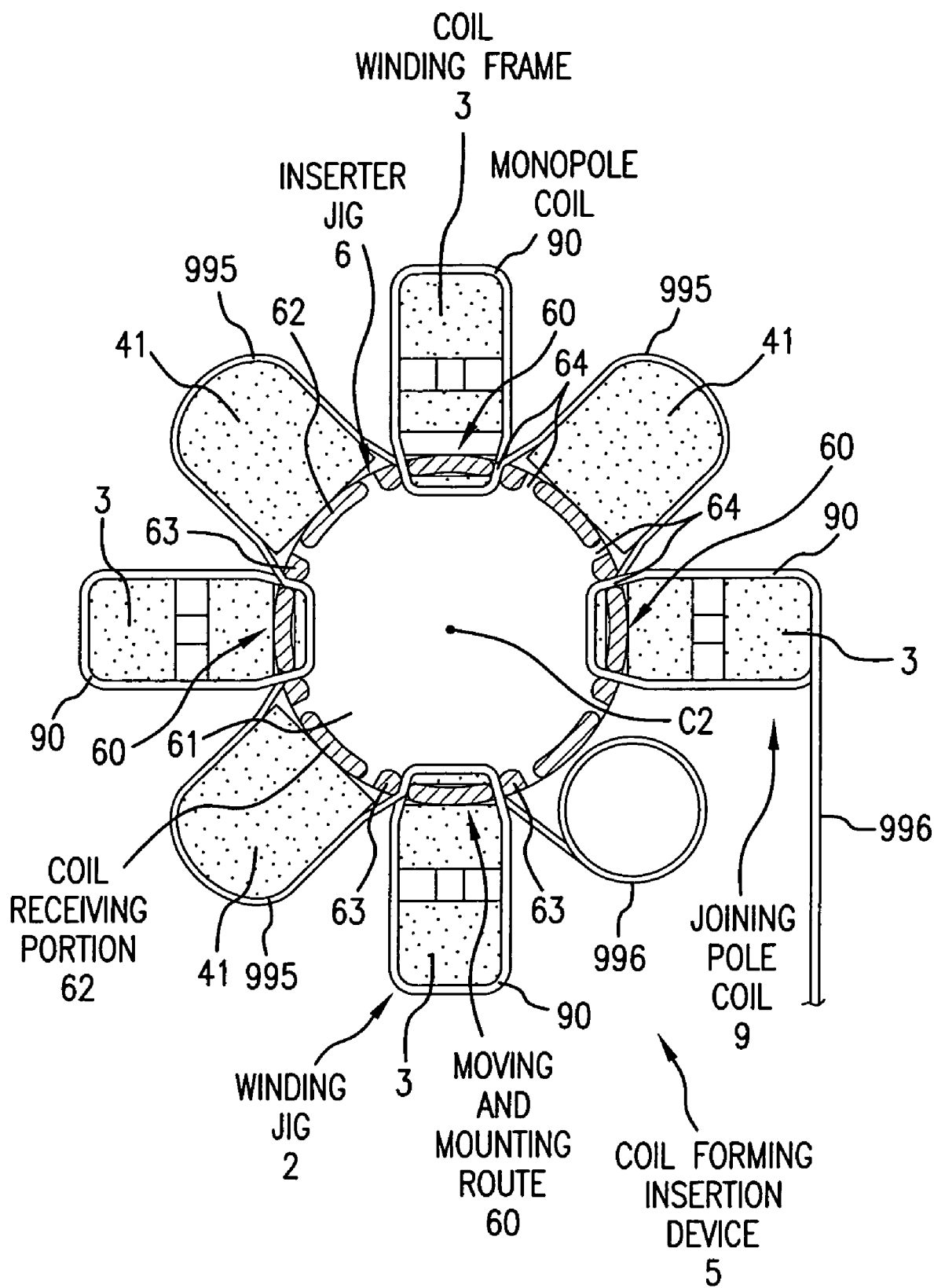
FIG. 12 is a plan view of the coil forming apparatus of a second embodiment in a state in which the multipole coil is in the process of being transferred from a winding jig onto an inserter jig.

As shown in FIG. 12, the winding jig 2 has plural coil winding frames 3 and the inserter jig 6 has plural coil receiving portions 62 for respectively receiving the monopole coils 90 from the coil winding frames 3.

Figure 16:
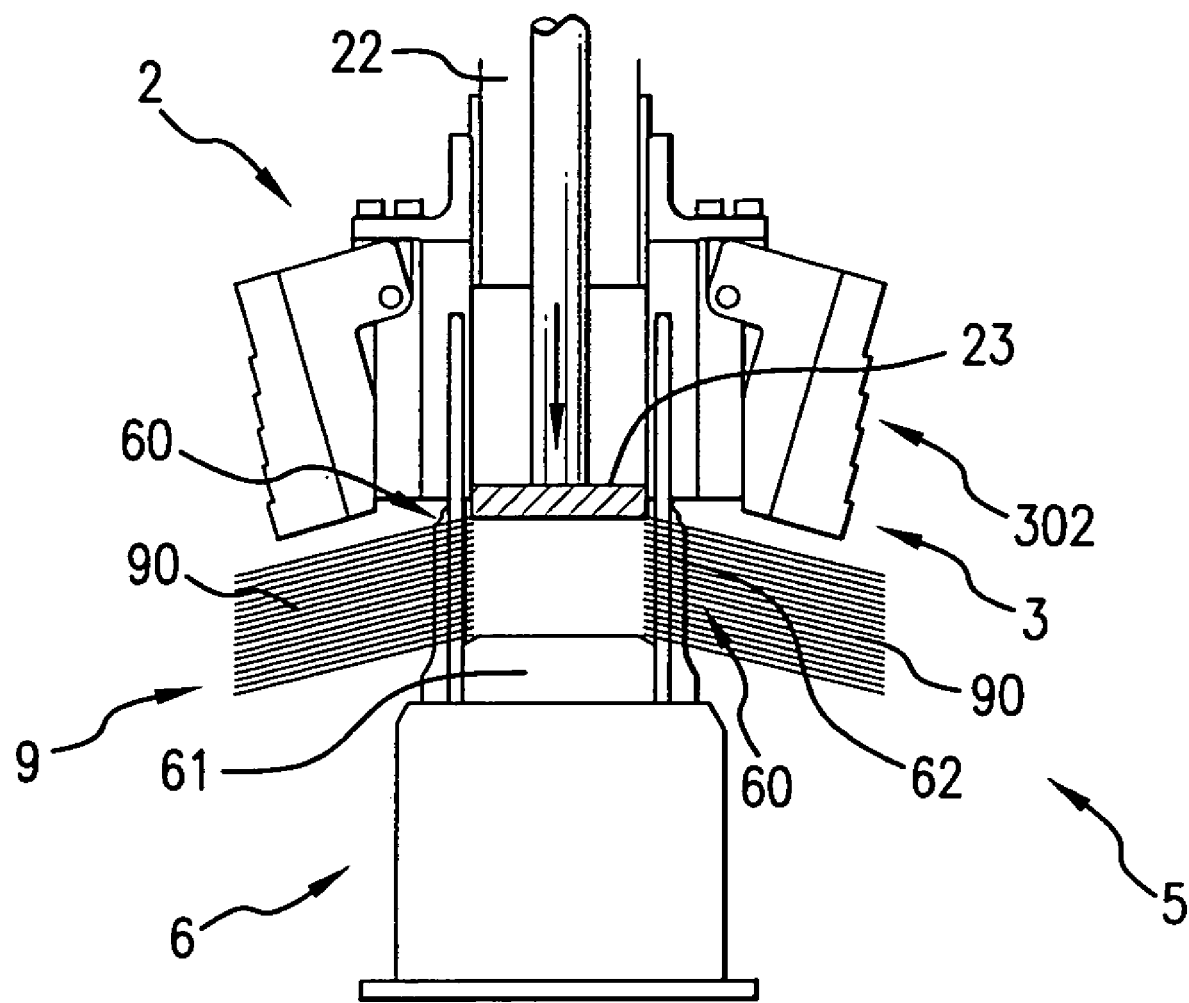
FIG. 16 is an explanatory view showing the coil forming apparatus of the second embodiment in a state in which a piston of the winding jig has been advanced and the multipole coil has been pushed to a prescribed position on the inserter jig.

As shown in FIG. 16, the coil forming insertion device 5 has each coil receiving portion 62 opposed to a coil winding frame 3, and the multipole coil 9, constructed by joining the monopole coils 90, is transferred from the winding jig 2 to the inserter jig 6.

As shown in FIGS. 1 and 2, in the above winding jig 2, the plural coil winding frames 3 are arranged at approximately the same radial distance from the central point of the winding jig 2. Further, in the winding jig 2, the winding axes C1 are approximately parallel to each other.

On the other hand, as shown in FIGS. 12 and 13, the above inserter jig 6 has an axially extendable core 61 for pushing the multipole coil 9 toward the slots 810 of the above stator core 81 and for inserting this multipole coil 9 into slots 810. The above plural coil receiving elements 62 are arranged on the outer circumferential face of the core 61 and respectively receive a monopole coil 90 from each coil winding frame 3.

Figure 14:
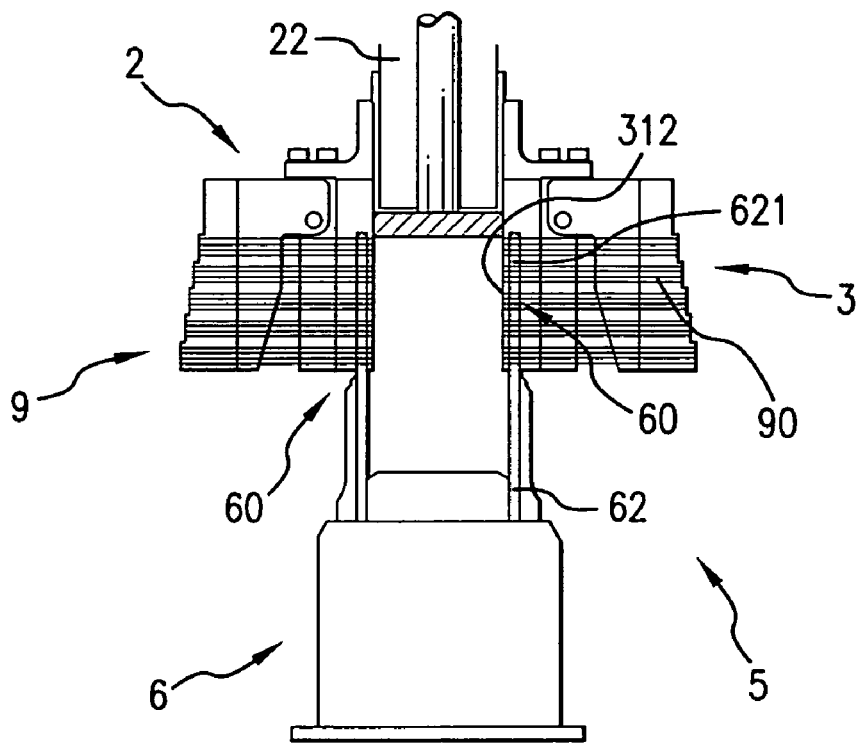
FIG. 14 is an explanatory view showing the coil forming apparatus of the second embodiment in a state in which the end of a coil receiving portion of the inserter jig has been fitted into a fitting slot in the coil winding frame of the winding jig.

In operation of the coil forming and insertion device 5, as shown in FIG. 14, when the multipole coil 9 is transferred from the winding jig 2 to the inserter jig 6, each coil receiving portion 62 is opposed to the tip face 311 of a coil winding frame 3 in alignment with its winding axis C1. Each paired coil winding frame 3 and coil receiving portion 62 are connected to each other to form a route 60 for transfer of a monopole coil 90.

As shown in FIG. 13, each coil winding frame 3 has a slot 312 for receiving the tip portion 621 of a coil receiving portion 62 of the inserter jig 6. In this embodiment, slot 312 extends parallel to winding axis C1 from the tip face 311 of each winding frame portion 31.

As shown in FIG. 14, slot 312 has a depth sufficient to allow the coil receiving portion 62 to extend completely through the monopole coil 90 wound around the coil winding frame 3. In other words, the slot 312 extends from the tip face 311 of each coil winding frame 3 further than the winding of coil 90.

As shown in FIGS. 12 and 14, each coil winding frame 3 and each coil receiving portion 62 can be connected by fitting the tip portion 621 of the coil receiving portion 62 into the receiving slot 312 of a coil winding frame 3. Further, the multipole coil 9 can be transferred from the winding jig 2 to the inserter jig 6 in this connected state.

As shown in FIGS. 12 and 13, the above winding jig 2 has a piston 23 ("transfer means") slidably mounted, so as to be advanced and retracted along the central rotation axis C3, within the center of the coil winding frames 3, for forcing the multipole coil 9 onto the above inserter jig 6. As shown in FIG. 16, piston 23 serves to push the multipole coil 9 off of a coil winding frames onto a coil receiving portions 62, to a predetermined position on the inserter jig 6, by advancing the piston 23 in the direction away from the turning arm 21.

Figure 18:
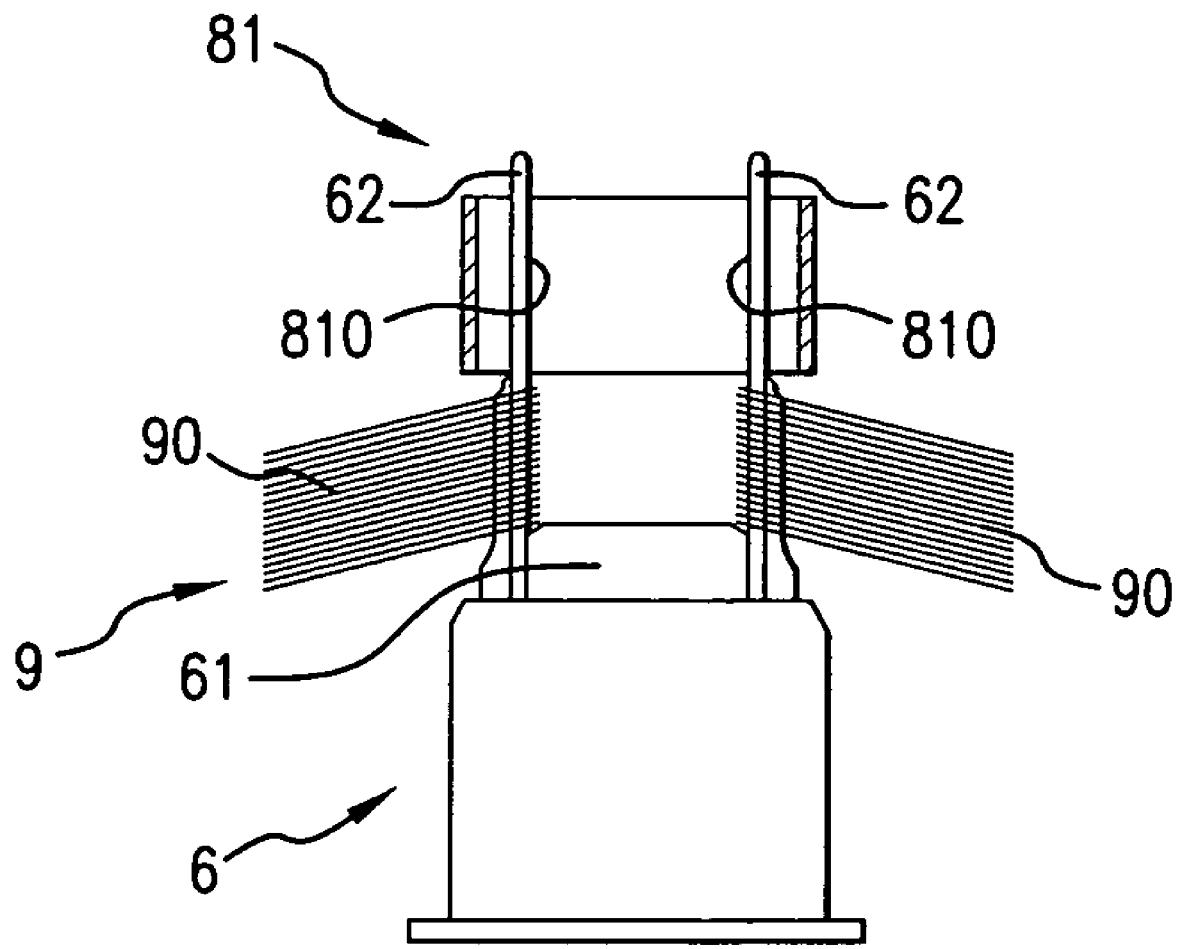
FIG. 18 is an explanatory view showing the coil forming apparatus of the second embodiment in a state in which the coil receiving portion of the inserter jig is inserted through the center face of a stator core.

In this second embodiment, as shown in FIG. 18, the above-mentioned predetermined position is set so that the multipole coil 9 can be transferred from the inserter jig 6 into slots 810 of the stator core 81. Therefore, after the multipole coil 9 is transferred to and mounted on the inserter jig 6, the multipole coil 9 in this mounted state can be inserted into a slot 810 of the stator core 81.

Figure 19:
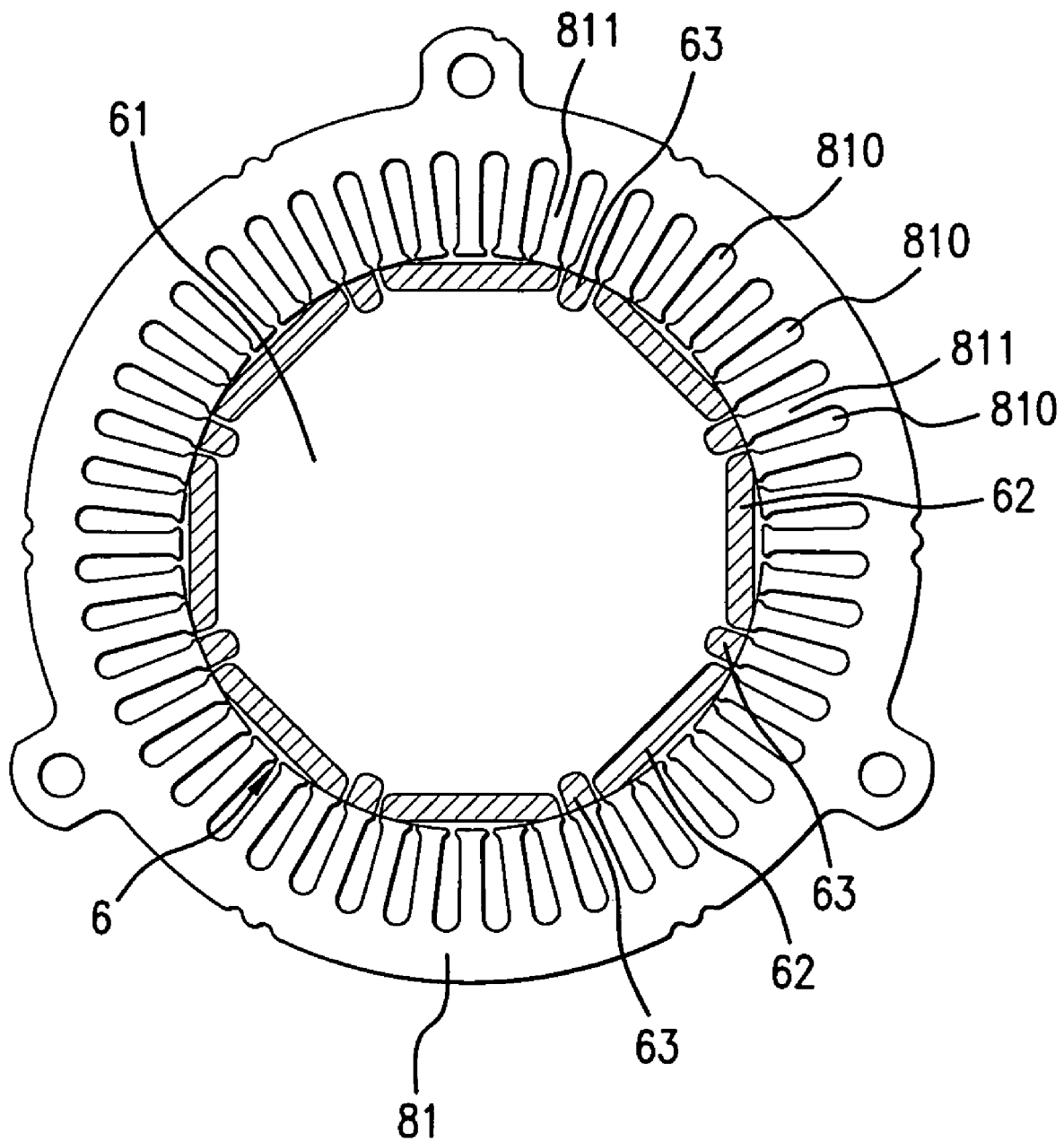
FIG. 19 is a cross-sectional view of coil receiving portions and guide portions of the inserter jig inserted into the stator core as shown in FIG. 18.

As shown in FIG. 12, the above inserter jig 6 has plural guides 63 arranged in approximately the same direction and arranged between the coil receiving portions 62. As shown in FIG. 19, these guides 63 are opposed to teeth 811 located between and defining the slots 810 of the stator core 81 and guide the insertion and arrangement of the multipole coil 9 into slots 810.

As also shown in FIG. 12, an insertion clearance 64 for receiving the electric wire 99 of the monopole coil 90 is provided between each guide 63 and the adjacent coil receiving portions 62 on both sides of the guide 63. When the electric wire 99 of each monopole coil 90 is inserted into a clearance 64 and arranged on coil receiving portions 62, each monopole coil 90 is constructed so as to connect this electric wire 99 with the electric wire 99 in the adjacent monopole coil

90. Thus, the electric wire 99 in each monopole coil 90 can be reliably inserted and arranged in the slots 810 of stator core 81.

Figure 20:
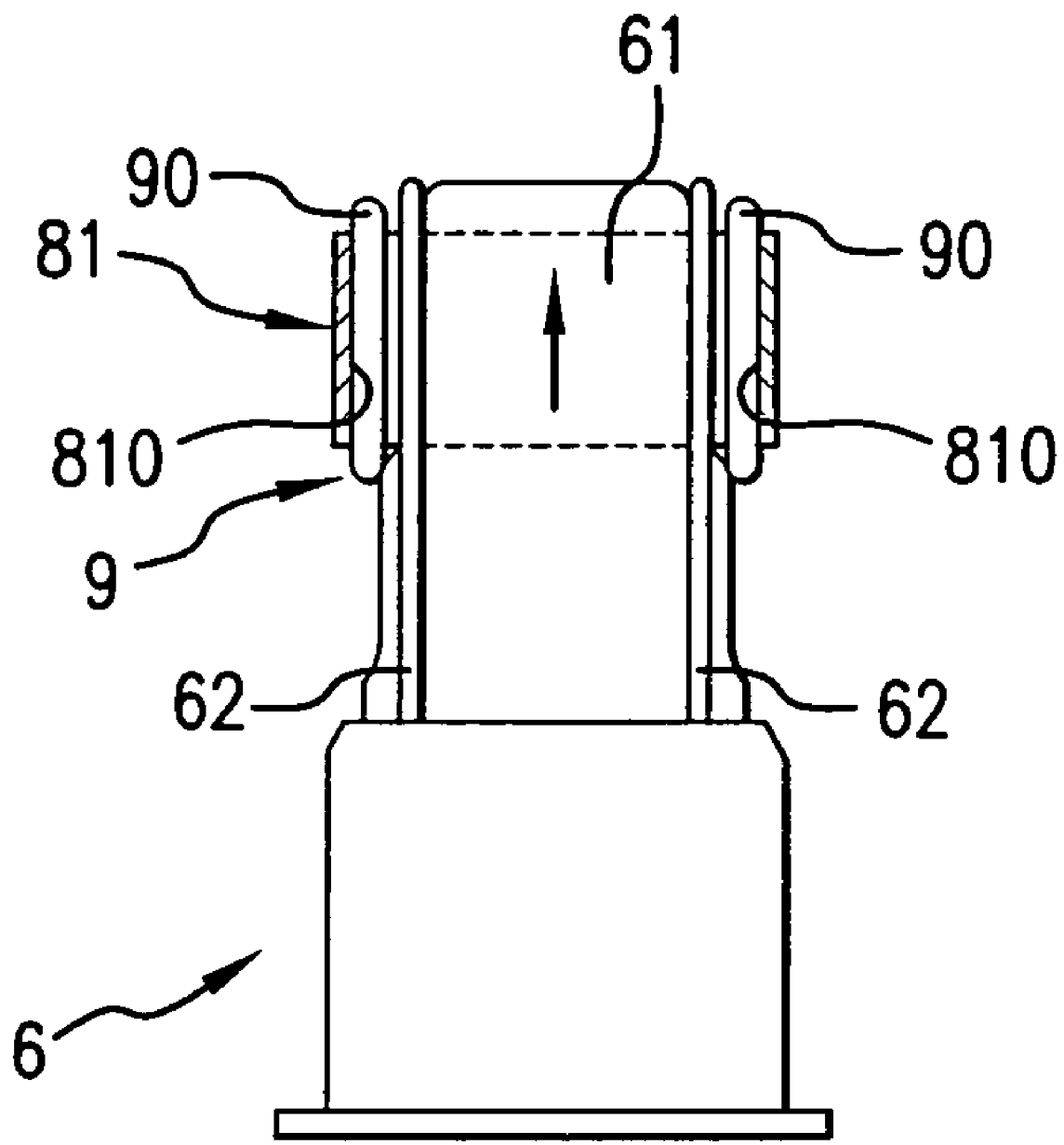
FIG. 20 is an explanatory plan view showing the coil forming apparatus of the second embodiment in a state wherein a multipole coil is inserted into the slots of the stator core, in accordance with the second embodiment.

As shown in FIG. 20, each piston 61 can be advanced and retracted relative to the coil receiving portions 62. When the coil receiving portions 62 and guides 63 are in position aligned with the inner circumference of the stator core 81, the monopole coils 90 held by the coil receiving portions 62 can be inserted into respective slots 810 by advancing the piston 61 toward the stator core 81.

A coil forming insertion method for coil transfer and mounting and a coil insertion process will next be explained. In the coil transfer step, the multipole coil 9, formed according to the method of the first embodiment, is transferred to the inserter jig 6. In the coil insertion step, the multipole coil 9 is inserted into the respective slots 810 of the stator core 81 by the inserter jig 6.

Next, the coil transfer step for moving the multipole coil 9 from the winding jig 2 to the inserter jig 6 will be explained.

As shown in FIG. 12, in this coil transfer step process, the multipole coil 9 is transferred from the winding jig 2 to the inserter jig 6 using the coil forming and insertion device 5.

As shown in FIG. 13, in the coil transfer step, the entire winding jig 2 is first advanced toward the inserter jig 6. At this time, each coil winding frame 3 has its outside winding frame portion 32 in the winding position 301 (FIG. 3) with each monopole coil 90 under tension set so as to avoid breakage after the winding operation has been completed.

As shown in FIG. 14, the tip 621 of each coil receiving portion 62 of the inserter jig 6 is fitted into the slot 312 of a coil winding frame 3 of the winding jig 2. Each coil winding frame 3 and each coil receiving portion 62 are connected by this operation, and a transfer path (surface) 60 for moving and mounting each monopole coil 90 is thereby formed.

In the above-described fitting (connecting) operation, the tip portion 621 of each coil receiving portion 62 is inserted and arranged within the central opening of each monopole coil 90.

Figure 15:
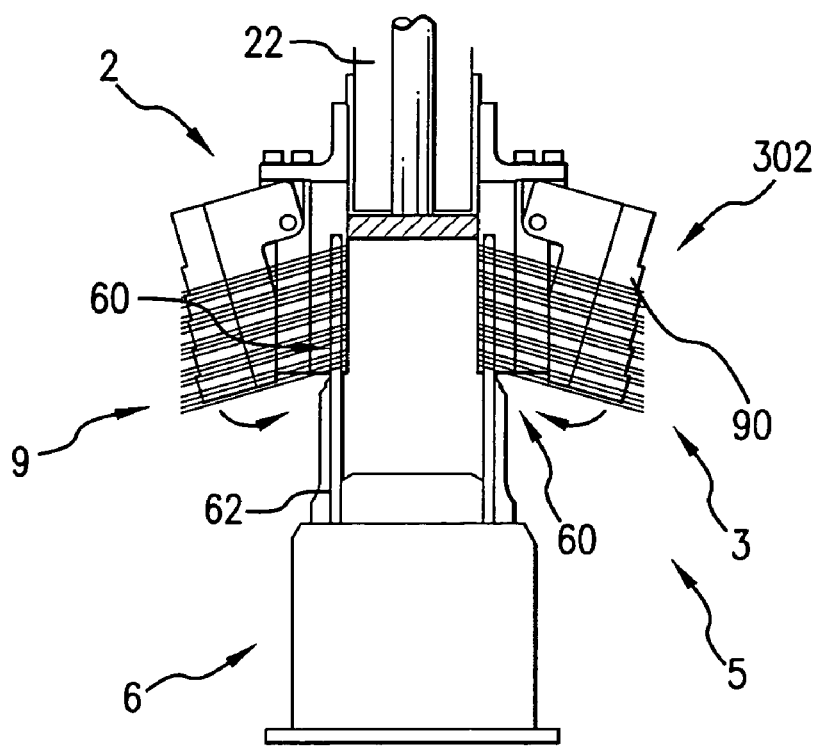
FIG. 15 is an explanatory view showing the coil forming apparatus of the second embodiment in a state in which each outside winding frame portion of each coil winding frame of the winding jig has been moved to the release position.

Next, as shown in FIG. 15, the outside winding frame portion 32 of the coil winding frame 3 is moved to the separating position 302 (FIG. 4) whereby the outside diameter of the coil winding frame 3 is reduced in the direction away from the turning arm 21. Therefore, each monopole coil 90 can be separated from the coil winding frame 3 on which it is mounted.

Next, as shown in FIG. 16, the piston 23 of the winding jig 2 is advanced toward the inserter jig 6 to push the monopole coil 90, wound around the outer circumference of the coil winding frame 3, until it reaches the prescribed position abutting the core 61 of the inserter jig 6.

At this time, a transfer path (surface) 60 is established within the central opening of each monopole coil 90, so that each monopole coil 90 can be transferred from its coil winding frame 3 to a coil receiving portion 62.

Figure 17:
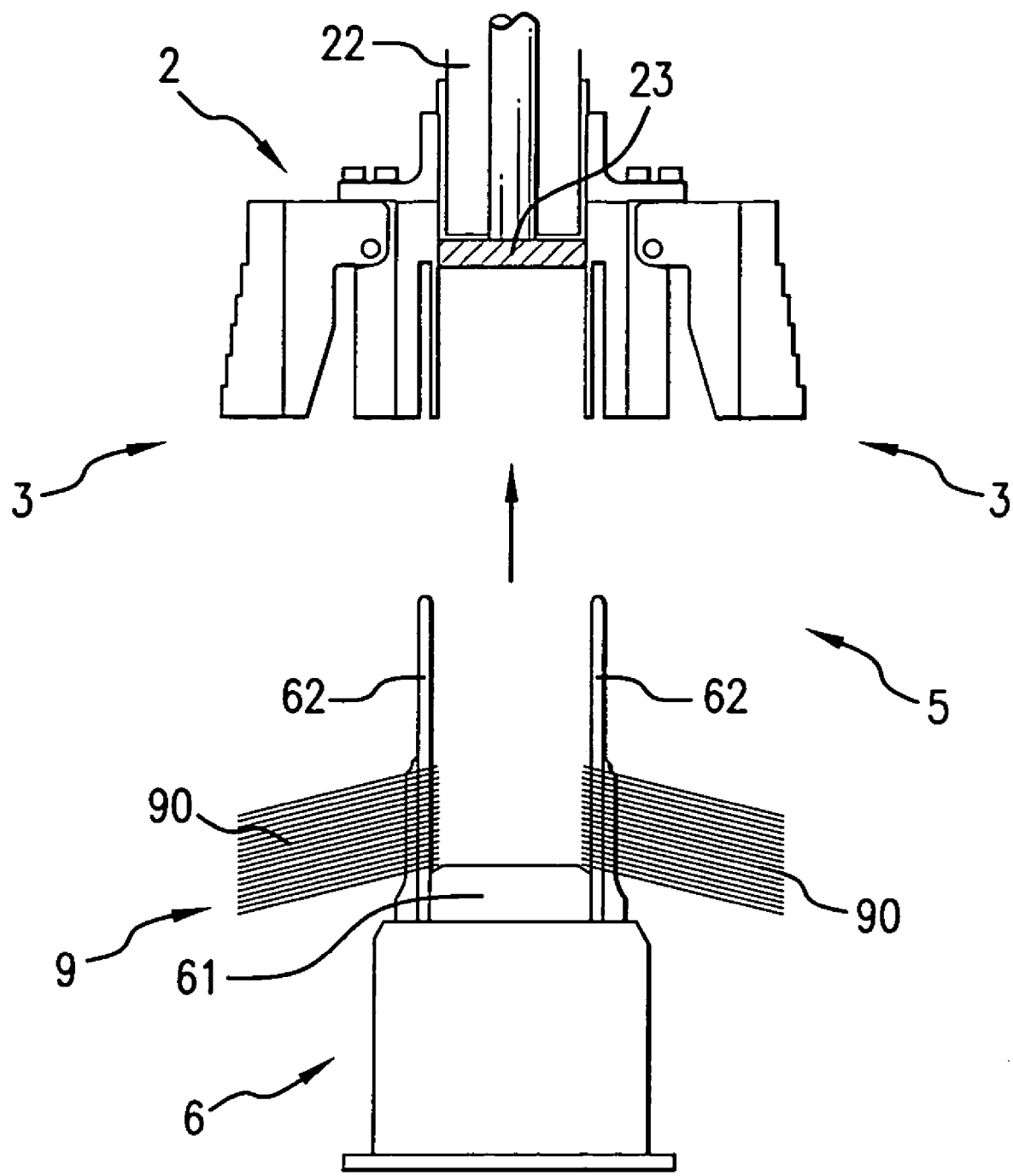
FIG. 17 is an explanatory view showing the coil forming apparatus of the second embodiment in a state in which the winding jig has been retracted from the inserter jig.

Thereafter, as shown in FIG. 17, the winding jig 2 is retracted and thereby separated from the inserter jig 6, and the multipole coil 9 is moved and completely mounted on the inserter jig 6.

The coil insertion process will next be explained.

As shown in FIGS. 18 to 20, in the coil insertion step, the multipole coil 9 held by the inserter jig 6 is inserted and arranged within the plural slots 810 formed on the inner circumferential face of the stator core 81.

As shown in FIGS. 18 and 19, coil receiving portions 62 of the inserter jig 6 are inserted into position opposing the inner circumferential face of the stator core 81. At this time, the above respective guides 63 are arranged opposing teeth 811 between the respective slots 810 on the inner circumferential face of the stator core 81.

Next, as shown in FIG. 20, the core 61 is advanced toward the stator core 81. At this time, the electric wire 99 of each monopole coil 90 held on the coil receiving portions 62 is inserted into and arranged in each slot 810. When the tip of the core 61 then extends toward the tips of the coil receiving portions 62 and is advanced, each monopole coil 90 is inserted into and arranged within a slot 810, and the multipole coil 9 is thereby incorporated into the stator core 81.

Thus, a stator for a three-phase motor, including U-phase, V-phase and W-phase, is manufactured in accordance with the above first and second embodiments. In this embodiment, the winding jig 2 is shown as having four coil winding frames 3 and three connecting wire winding frames 41, and the inserter jig 6 has eight coil receiving portions 62 and eight guides 63.

A four-pole coil as the multipole coil 9 is formed on the winding jig 2 by joining four monopole coils 90, and transferred to and inserted into a core by the inserter jig 6. This process is then repeated to assemble two four-pole coils within the stator core 81 to form the U-phase as an eight-pole coil (two joined four-pole coils). To form the V-phase and the W-phase, an eight-pole coil is similarly formed by joining two four-pole coils in the above-described manner.

Thus, by use of plural coil winding frames 3 arranged in the winding jig 2 to form a monopole coil 90 on each coil winding frame 3, the monopole coils can be formed with their relative positions fixed, and it is possible to fix the length of the connecting wires 995 formed between the monopole coils 90.

Further, with each coil winding frame 3 connected with coil receiving portions 62, when the monopole coils 90 are transferred from the coil winding frames 3 to the coil receiving portions 62, each monopole coil 90 can be reliably moved along a transfer path 60 within the central opening of the monopole coil 90.

Each monopole coil 90 can be approximately simultaneously transferred to the coil receiving portions 62. Therefore, in this transfer, there is almost no case in which the winding order of each electric wire 99 in a monopole coil 90 is different from the winding order in which the above winding operation is performed. In other words, when the monopole coils 90 having their winding diameter increased from one side to the other are transferred to and mounted on the inserter jig 6, the winding order of the wire on each is not changed and the monopole coil 90 can be transferred and mounted with each electric wire 99 in proper alignment.

Therefore, the multipole coil 9 can be transferred from the winding jig 2 to the inserter jig 6 almost without changing the state of the multipole coil 9.

The invention claimed is:

1. A coil forming and insertion apparatus comprising:
   a winding jig for forming a multipole coil of joined plural monopole coils;
   an inserter jig opposed to said winding jig, for inserting and arranging the multipole coil in slots extending radially outward from a central opening in a stator core, said inserter jig comprising plural coil receiving elements for respectively receiving the monopole coils from said coil winding frames, each of said coil receiving elements being aligned with a coil winding frame; and
   transfer means for transferring the multipole coil from said winding jig to said inserter jig; and
   wherein said winding jig comprises:

plural coil winding frames, each of said coil winding frames defining a winding axis and receiving loops of wire wound thereon to form one of said plural monopole coils a turning arm rotatable around a central turning axis and an index holder rotatably supported by the turning arm for rotation relative to the turning arm around a central axis of rotation offset from and parallel to said central turning axis; and wherein said plural coil winding frames are arranged depending from said index holder in a circular array and approximately equidistant from said central axis of rotation;

wherein said winding axes of said respective coil winding frames are approximately parallel to each other and to said central turning axis; and wherein each coil winding frame is reciprocably mounted for movement along said central turning axis relative to said index holder, between a retracted position and an advanced position wherein the winding frame is projected toward said inserter jig, axially beyond the remaining coil winding frames.

2. The coil forming and insertion apparatus according to claim 1, wherein each coil winding frame has a tip face with a fitting slot extending therefrom in parallel with the winding axis, for receiving tip portions of the coil receiving elements, said coil receiving elements, when fitted within said fitting slots, forming transfer surfaces for moving said multipole coil from said winding jig onto said inserter jig.

3. The coil forming and insertion apparatus according to claim 1, wherein said winding jig has a piston mounted centrally of said coil winding frames for reciprocating movement between a retracted position and an advanced position, whereby movement of said piston toward the advanced position serves to transfer said multipole coil to said inserter jig.

4. The coil forming and insertion apparatus according to claim 1, wherein each coil winding frame includes:

an inside portion and an outside portion radially outward of said inside portion relative to the winding axis; and moving means for moving said outside portion relative to said inside portion to change the distance between the outside portion and the inside portion between a winding position for winding the electric wire thereon and a release position for removal of the monopole coil after the winding has been completed.

5. The coil forming and insertion apparatus according to claim 4, wherein said outside winding frame portion is stepwise increased in diameter toward said inserter jig.

6. A coil forming and insertion apparatus comprising:

a winding jig, rotatable around a central axis, for forming a multipole coil of joined plural monopole coils, said winding jig comprising:

plural coil winding frames, each of said coil winding frames defining a winding axis and receiving loops of wire wound thereon to form one of said plural monopole coils, wherein said winding axes are approximately parallel to each other and equidistant from said central axis; and a turning arm rotatable around a central turning axis and an index holder rotatably supported by the turning arm for rotation relative to the turning arm around a central axis of rotation offset from and parallel to said central turning axis; and an inserter jig opposed to said winding jig and comprising:

a slidable core, aligned with the central axis, for inserting and arranging the multipole coil into a slot extending radially outward from a central opening in a stator; and coil receiving elements arranged around an outer circumference of each slidable core for connecting with respective coil winding frames to form a transfer surface for transfer of the monopole coils from said coil winding frames onto said coil receiving elements, said slidable cores being extendable to transfer a monopole coil from a coil receiving element into the slot in the stator; and wherein said plural coil winding frames are arranged depending from said index holder in a circular array and approximately equidistant from said central axis of rotation;

wherein said winding axes of said respective coil winding frames are approximately parallel to each other and to said central turning axis; and wherein each coil winding frame is reciprocably mounted for movement along said central turning axis relative to said index holder, between a retracted position and an advanced position wherein the winding frame is projected toward said inserter jig, axially beyond the remaining coil winding frames.

7. The coil forming and insertion apparatus according to claim 6, wherein each coil winding frame has a tip face with a fitting slot extending therefrom in parallel with the winding axis, for receiving tip portions of the coil receiving elements, said coil receiving elements, when fitted within said fitting slots, forming transfer surfaces for moving said multipole coil from said winding jig onto said inserter jig.

8. The coil forming and insertion apparatus according to claim 6, wherein said winding jig has a piston mounted for reciprocating movement along the central axis, between a retracted position and an advanced position, whereby movement of said piston toward the advanced position serves to transfer said multipole coil to said inserter jig.

9. The coil forming and insertion apparatus according to claim 6, wherein each coil winding frame includes:

an inside portion and an outside portion radially outward of said inside portion relative to the winding axis; and moving means for moving said outside portion relative to said inside portion to change the distance between the outside portion and the inside portion between a winding position for winding the electric wire thereon and a release position for removal of the monopole coil after the winding has been completed.

10. The coil forming and insertion apparatus according to claim 9, wherein said outside winding frame portion is stepwise increased in diameter toward said inserter jig.

11. A coil forming and insertion method utilizing a winding jig having plural winding frames for forming a multipole coil and an inserter jig for inserting and arranging the multipole coil in slots extending radially outward from a central opening in a stator core, said method comprising:

winding an electric wire around each of the plural coil winding frames to form plural monopole coils connected as a multipole coil; and transferring the plural monopole coils from said winding frames onto coil receiving elements of said inserter jig;

wherein each monopole coil is released from each coil winding frame by reducing the outside diameter of each coil winding frame in said transferring;

wherein, in the winding step, the outside diameter of each monopole coil is increased in a direction toward the inserter jig by winding the electric wire around a winding frame having its outside diameter increased stepwise in said direction; and wherein, in the transferring step, each monopole coil is released from each coil winding frame by reducing the outside diameter of each coil winding frame in said direction.

12. The coil forming and insertion method according to claim 11, wherein each monopole coil is delivered from a coil winding frame to a coil receiving element along a continuous surface formed by insertion of a tip portion of a coil receiving element into a slot extending in parallel with the winding axis from an end face of a coil winding frame.

13. The coil forming and insertion method according to claim 11, wherein the winding jig comprises a piston and wherein said transferring is by advancing the piston toward the inserter jig, whereby the multipole coil is delivered to a predetermined position on the inserter jig.

14. A coil forming and insertion method comprising:
    winding an electric wire into loops around each of plural coil winding frames of a winding jig to form a monopole coil on each of the winding frames, with the monopole coils joined together in a circular array as a multipole coil, wherein the coil winding frames are approximately parallel to each other;
    inserting plural coil receiving elements, surrounding a core mounted on an inserter jig for axial sliding movement relative to the receiving elements, into slots in respective coil winding frames and thereby connecting with the coil winding frames to form a transfer surfaces;
    transferring the monopole coils along the transfer surfaces, from the winding jig onto to the inserter jig; and
    advancing the core of the inserter jig to insert the multipole coil into slots in a stator core; and
    wherein each monopole coil is released from each coil winding frame by reducing the outside diameter of each coil winding frame in said transferring;
    wherein, in the winding step, the outside diameter of each monopole coil is increased in a direction toward the inserter jig by winding the electric wire around a winding frame having its outside diameter increased stepwise in said direction; and
    wherein, in the transferring step, each monopole coil is released from each coil winding frame by reducing the outside diameter of each coil winding frame in said direction.

15. The coil forming and insertion method according to claim 14, wherein each monopole coil is delivered from a coil winding frame to a coil receiving element along a continuous surface formed by insertion of a tip portion of a coil receiving element into a slot extending in parallel with the winding axis from an end face of a coil winding frame.

16. The coil forming and insertion method according to claim 14, wherein the winding jig comprises a piston and wherein said transferring is by advancing the piston toward the inserter jig, whereby the multipole coil is delivered to a predetermined position on the inserter jig.

17. The coil forming and insertion method according to claim 11, wherein the inserter jig has plural coil receiving elements surrounding a core mounted for axial sliding movement relative to the coil receiving elements, wherein the central opening of the stator core is defined by an inner circumferential surface formed of teeth between the radially extending slots and wherein the method further comprises:
    inserting the plural coil receiving elements into the central opening of the stator core facing the inner circumferential surface; and
    advancing the core toward the stator core to insert the multipole coil into the slots of the stator core.

18. The coil forming and insertion method according to claim 17, wherein the inserter jig further has guides between adjacent coil receiving elements and wherein the method further comprises aligning the guides facing the teeth prior to the advancing of the core relative to the stator core.

19. The coil forming and insertion method according to claim 14, wherein the inserter jig further has guides between adjacent coil receiving elements and wherein the method further comprises aligning the guides facing the teeth prior to the advancing of the core relative to the stator core.

* * * * *

UNITED STATES PATENT AND TRADEMARK OFFICE
CERTIFICATE OF CORRECTION

PATENT NO.        : 7,467,648 B2
APPLICATION NO.   : 10/529741
DATED             : December 23, 2008
INVENTOR(S)       : Shingo Hashimoto et al.

Page 1 of 1

It is certified that error appears in the above-identified patent and that said Letters Patent is hereby corrected as shown below:

Column 17, line 32 (claim 14, line 12), "a transfer" should read -- transfer --.

Column 17, line 34 (claim 14, line 14), "onto to" should read -- onto --.

Signed and Sealed this

Sixteenth Day of June, 2009

JOHN DOLL
*Acting Director of the United States Patent and Trademark Office*